United States Patent
Such et al.

(10) Patent No.: US 11,715,014 B2
(45) Date of Patent: Aug. 1, 2023

(54) SYSTEM AND METHOD OF CHARACTER RECOGNITION USING FULLY CONVOLUTIONAL NEURAL NETWORKS WITH ATTENTION

(71) Applicant: Kodak Alaris Inc., Rochester, NY (US)

(72) Inventors: Felipe Petroski Such, Rochester, NY (US); Raymond Ptucha, Rochester, NY (US); Frank Brockler, Rochester, NY (US); Paul Hutkowski, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 329 days.

(21) Appl. No.: 17/075,511

(22) Filed: Oct. 20, 2020

(65) Prior Publication Data

US 2021/0034849 A1   Feb. 4, 2021

Related U.S. Application Data

(60) Division of application No. 15/812,681, filed on Nov. 14, 2017, now Pat. No. 10,846,523, which is a
(Continued)

(51) Int. Cl.
*G06N 3/084* (2023.01)
*G06F 40/242* (2020.01)
(Continued)

(52) U.S. Cl.
CPC .......... *G06N 3/084* (2013.01); *G06F 18/2413* (2023.01); *G06F 40/242* (2020.01);
(Continued)

(58) Field of Classification Search
CPC .... G06V 30/36; G06V 30/347; G06V 10/454; G06V 30/1478; G06V 30/414;
(Continued)

(56) References Cited

U.S. PATENT DOCUMENTS 5,416,851 A * 5/1995 Huttenlocher ....... G06V 30/184
382/199
5,442,715 A * 8/1995 Gaborski ............. G06V 10/768
382/229

(Continued)

*Primary Examiner* — Mark Roz
(74) *Attorney, Agent, or Firm* — Hogan Lovells US LLP

(57) ABSTRACT

Embodiments of the present disclosure include a method that obtains a digital image. The method includes extracting a word block from the digital image. The method includes processing the word block by evaluating a value of the word block against a dictionary. The method includes outputting a prediction equal to a common word in the dictionary when a confidence factor is greater than a predetermined threshold. The method includes processing the word block and assigning a descriptor to the word block corresponding to a property of the word block. The method includes processing the word block using the descriptor to prioritize evaluation of the word block. The method includes concatenating a first output and a second output. The method includes predicting a value of the word block.

6 Claims, 34 Drawing Sheets

Related U.S. Application Data continuation-in-part of application No. 15/708,918, filed on Sep. 19, 2017, now abandoned, and a continuation-in-part of application No. 15/709,014, filed on Sep. 19, 2017, now Pat. No. 10,936,862.

(60) Provisional application No. 62/524,983, filed on Jun. 26, 2017, provisional application No. 62/422,000, filed on Nov. 14, 2016.

(51) Int. Cl.
*G06V 30/32* (2022.01)
*G06V 30/414* (2022.01)
*G06V 30/146* (2022.01)
*G06F 18/2413* (2023.01)
*G06N 3/044* (2023.01)
*G06N 3/045* (2023.01)
*G06V 30/18* (2022.01)
*G06V 10/764* (2022.01)
*G06V 10/82* (2022.01)
*G06V 30/10* (2022.01)

(52) U.S. Cl.
CPC ............ *G06N 3/044* (2023.01); *G06N 3/045* (2023.01); *G06V 10/764* (2022.01); *G06V 10/82* (2022.01); *G06V 30/1478* (2022.01); *G06V 30/18057* (2022.01); *G06V 30/347* (2022.01); *G06V 30/36* (2022.01); *G06V 30/414* (2022.01); *G06V 30/10* (2022.01)

(58) Field of Classification Search
CPC ...... G06V 30/10; G06F 40/242; G06K 9/627; G06N 3/0445; G06N 3/0454; G06N 3/084
USPC ........................................................ 382/229
See application file for complete search history.

(56) References Cited

U.S. PATENT DOCUMENTS

| | | | |
|---|---|---|---|
| 2004/0086179 A1* | 5/2004 | Ma | G06V 30/268 382/177 |
| 2015/0363625 A1* | 12/2015 | Wu | G06V 10/44 382/203 |

* cited by examiner

SYSTEM AND METHOD OF CHARACTER RECOGNITION USING FULLY CONVOLUTIONAL NEURAL NETWORKS WITH ATTENTION

CROSS REFERENCE TO RELATED APPLICATIONS

This application is a divisional of U.S. patent application Ser. No. 15/812,681 filed Nov. 14, 2017, titled "SYSTEM AND METHOD OF CHARACTER RECOGNITION USING FULLY CONVOLUTIONAL NEURAL NETWORKS," which is a continuation-in-part of U.S. patent application Ser. Nos. 15/708,918 and 15/709,014, both filed on Sep. 19, 2017, which claim priority to and the benefit of U.S. Provisional Application Ser. No. 62/422,000 filed Nov. 14, 2016, and U.S. Provisional Application Ser. No. 62/524,983 filed Jun. 26, 2017. The full disclosure and contents of the above-referenced applications are hereby incorporated herein by reference in their entirety for all purposes.

BACKGROUND

1. Field of the Invention

The present disclosure relates to digital character recognition. More particularly, the present disclosure relates to systems and methods for digital character recognition of handwritten text or digitized text.

2. Description of Related Art

Intelligent Character Recognition (ICR) is the task of deciphering digitized handwritten text. In certain systems, lines and sections of the handwritten text are extracted based on white space positioned between blocks of text. From there, dictionary based recognition systems may be utilized to determine the context of the blocks of text. However, handwritten text has virtually infinite different styles because no two handwritten symbols are identical, and based on the writing styles of the person that transcribed the text, and therefore traditional methods typically associated with Optical Character Recognition (OCR) may not produce satisfactory results. Accordingly, various neural networks (e.g., convolutional, recurrent, and the like) may be utilized with a variety of techniques to improve the recognition of handwritten text. These methods may be processing intensive, or produce insufficient results due to the reliance on techniques utilized in OCR. It is now understood that improved methods of digital character recognition of handwritten text are desired.

Convolutional Neural Networks (CNNs) have revolutionized the computer vision and pattern recognition community, and specifically offline handwriting recognition. Jaderberg et al. used CNNs on OCR tasks in natural images. Poznanski and Wolf used deep CNNs to extract n-grams which feed Canonical Correlation Analysis (CCA) for final word recognition. Although this approach performs well in applications with fixed vocabulary, increasing the size of the vocabulary significantly impacts performance. More importantly, applications with phone numbers, surnames, street addresses, etc. could have unbounded dictionaries. Recurrent Neural Networks (RNNs) such as Long Short Term Memory (LSTM) units, split an image into segments and read it as a sequence of inputs. Connectionist Temporal Classification (CTC) further eliminates the need for precise alignment. Xie et al. used CNNs to feed a multi-layer LSTM network for handwritten Chinese character recognition Similar techniques have also been used for text recognition in natural imagery.

Sun et al. used deep convolution layers followed by multidimensional RNNs. Voigtlaender et al. used alternating layers of convolution followed by multidimensional RNNs. Voigtlaender et al. performed ICR at the paragraph level to include language context. Recent Fully Convolutional Neural Network (FCN) methods take in arbitrary size images and output region level classification for simultaneous detection and classification. Handwritten word blocks have arbitrary length and can benefit from FCN methods. By using an initial CNN to calculate the number of symbols in a word block, word blocks can be resized to a canonical height tuned to a FCN architecture. Knowing the average symbol width, this FCN can then perform accurate symbol prediction without CTC post processing.

Offline handwriting recognition is more challenging problem than online handwriting recognition. In online handwriting recognition, features can be obtained from both pen trajectories and image, whereas in offline handwriting recognition, features can only be obtained using a still image. In both the cases, input features have traditionally been extracted from data, then a classifier like Artificial Neural Network (ANN) or Gaussian Mixture Model (GMM), were used to estimate posterior probabilities. These posterior probabilities were given as an input to a Hidden Markov Model (HMM) to generate transcriptions. One of the major disadvantages of HMMs is that they fail to model long term dependencies in input data. However, Recurrent Neural Networks (RNNs) such as Long Short Term Memory (LSTM) units can help to resolve this drawback. LSTMs can model long dependencies and have shown improvement in sequence learning tasks like speech recognition, machine translation, video summarization, and more.

One of the advantages of using deep neural networks is that inputs can be unprocessed data such as raw pixels of an image, rather than extracting specific features in previous methods. Input to RNNs is usually 1D. For example, in online handwriting recognition, it is pen stoke grid values. But in offline recognition, the input is a 2D image. A naive way would be taking every column of an image as a 1D vector and feeding it as an input to a RNN. However, this cannot handle distortions along the vertical axis. The same image will look different if a pixel is shifted down by one pixel. Another way to tackle this problem is to use multidimensional RNNs, which take contextual information from several the directions, e.g. left, right, top and bottom. The idea is to use both spatial and temporal information. The use of Connectionist Temporal Classification (CTC) enables the use of inputs without any prior segmentation as opposed to forcefully aligning inputs in previous approaches. One of the major advantages of the CTC algorithm is that you do not need properly segmented labeled data. The CTC algorithm takes care of the alignment of input with the output.

Recognizing handwritten characters in traditional approaches involves extracting features for classification, extracting features for segmentation, and parsing to map spatial relationships among characters for recognition. Segmenting of text into lines, words, and characters require sophisticated approaches. Segmenting unconstrained handwritten words or characters is much more difficult than typed text because text can undulate up and down. Huang and Srihari described an approach to separate a line of unconstrained text to words. They proposed a gap metrics based approach to perform word segmentation task. They extracted local features like distance between current pair of components, distance between previous and next pair of components, width and height of left and right components, along with global components like average height, width of grouped components and average distance between components.

Rather than segmenting words some methods segment characters, Gader et al. proposed character segmentation utilizing information as you move from background pixels to foreground pixels in horizontal and vertical directions of the character image. Transition is performed based on traversals in left to right, right to left, top to bottom and bottom to top direction. Whenever a transition is encountered from background to foreground, the ratio between location of the pixel and distance across the image in that direction is calculated. Liu and Blumenstein proposed character recognition using a combination of transition and direction features, which they called Modified Direction Feature. For each transition, a pair of location of transition and direction of transition is used for segmentation. Crossing features are used in character recognition, where the idea is to find the number of times a line intersects a trace of the character. If the line intersects at multiple places then the first and last intersection can be used to describe shape of the symbol.

Doetsch et al. proposed hybrid RNN-HMM for English offline handwriting recognition. In order to get framewise labeling they applied HMM to the training data. These frames were then used as an input to an RNN, with corresponding target labels. The system was trained to get posterior probabilities which generated emission probabilities for an HMM, which were used to generate transcription for a given input. They introduced a new technique of scaling gates of a LSTM memory cell by using a scalar multiple for every gate in each layer of the RNN. The scaling technique for LSTM gates reduced Character Error Rate (CER) by 0.3%. Bluche et al. compared Convolutional Neural Network (CNN) and traditional feature extraction techniques along with HMM for transcription.

CNNs work on a sliding window technique, where a filter of fixed width is scanned across an image to extract features from it. CNNs predict the posterior probabilities for each filter. One of the difficulties using this approach is assigning labels to input sliding windows. GMM-HMM trained on handcrafted features are used to assign a label to the sliding window portion. Thus, the system can be trained end to end and the posterior probabilities can be used to estimate emission probabilities for the HMM, which outputs the final labeling sequence. This technique outperforms traditional feature extraction methods for offline handwriting recognition.

Pham et al. proposed Multidimensional RNN using dropout to improve offline handwriting recognition performance. RNNs with dropout prevent over fitting on the training set, similar to regularization. Using dropout improved accuracy by 3%. Deep CNNs for offline handwriting recognition have also been used for languages other than English. Dewan and Srinivasa used DNNs for offline character recognition of Telugu characters. They used auto encoders, where the model was trained in a greedy layer wise fashion to learn weights in an unsupervised fashion, then fine-tuned by training the network with supervised data.

SUMMARY

Applicants recognized the problems noted above herein and conceived and developed embodiments of system and method, according to the present disclosure, for identification of handwritten text.

Embodiments of the present disclosure describe systems and methods for extracting symbols from a digitized object for character recognition. In embodiments, a system architecture providing one or more neural networks, such as a Fully Convolution Network are utilized to analyze digitized images. In embodiments, the one or more neural networks determine line whitespace to form digitized line blocks. The methods may also include transforming digitized line blocks into one or more word blocks separated by whitespace, and recognizing symbols in each word block. In embodiments, recognition of symbols in each word block includes transforming each word block to a canonical representation of fixed height. The recognition may also include passing each stream of symbols and blanks into a first dictionary checker to assign most common words. If the stream of symbols and blanks is amongst most common words the method may end. Otherwise, the method includes passing each stream of symbols and blanks into a second word block descriptor generator. The method also includes passing each stream of symbols and blanks into a third word length prediction to resize the word block to canonical width spacing of symbols, where the width is based upon a prediction of the number of symbols in the word block. Moreover, in embodiments the method further includes passing each resized word block along with word block descriptors through a fourth fully convolutional neural network trained which determines symbols and blanks. The method may also include passing symbols and blanks through a symbol based probabilistic correction. Additionally, the method may include outputting determined symbols in word block from first dictionary checker, the symbol specific translator, or a combination thereof.

In an embodiment a system includes at least one processor. The system also includes memory including instructions that, when executed by the at least one processor, cause the system to receive a digitized object, the digitized object corresponding to an image including at least one symbol. The instructions also cause the system to form digitized line blocks from the digitized object by determining whitespace separators in the digitized object. The instructions further cause the system to transform the line blocks into one or more word blocks separated by whitespace, the one or more word blocks having a value associated with at least one symbol forming the one or more word blocks. The instructions also cause the system to resize each word block of the one or more word blocks into a canonical representation of a fixed height. The instructions further cause the system to evaluate each word block of the one or more word blocks with a dictionary, the dictionary containing a collection of common words. The instructions also cause the system to output a first word prediction when one or more of the word blocks correspond to a word in the collection. The instructions further cause the system to assign one or more descriptors to the one or more word blocks when the one more word blocks do not correspond to the collection. The instructions also cause the system to perform probabilistic correction on the one or more word blocks. The instructions further cause the system to output a second word prediction, the second word prediction corresponding to the value of the word block.

In a further embodiment a computer-implemented method includes obtaining a digital image. The method also includes extracting a word block from the digital image, the word block input including at least one symbol. The method further includes processing the word block with a first neural network, the first neural network evaluating a value of the word block against a dictionary, the dictionary containing a collection of most common words. The method also includes outputting a prediction equal to a common word when a confidence factor is greater than a predetermined threshold. Additionally, the method includes processing the word block with a second neural network, the second neural network assigning a descriptor to the word block corresponding to a property of the word block. The method further includes processing the word block with a third neural network, the third neural network using the descriptor to prioritize evaluation of the word block. The method also includes concatenating an output of the second neural network and an output of the third neural network. The method further includes predicting a value of the word block.

In an embodiment a non-transitory computer-readable storage medium storing instructions that, when executed by at least one processor of a computing device, cause the computing device to receive a digital image corresponding to a word block, the word block containing at least one symbol corresponding to a letter, number, character, or a combination thereof. The instructions also cause the computing device to evaluate the word block with a first neural network, the first neural network assigning at least one of a descriptor or a steering factor to the word block. The instructions further cause the computing device to process the word block with a second neural network, the second neural network evaluating the at least one of the descriptor or the steering factor to prioritize evaluation. The instructions further cause the computing device to combine a first output from the first neural network and a second output from the second neural network. Also, the instructions cause the computing device to output a predicted word corresponding to a value of the word block.

BRIEF DESCRIPTION OF DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

Figures 11A, 11B, 11C, 11D:
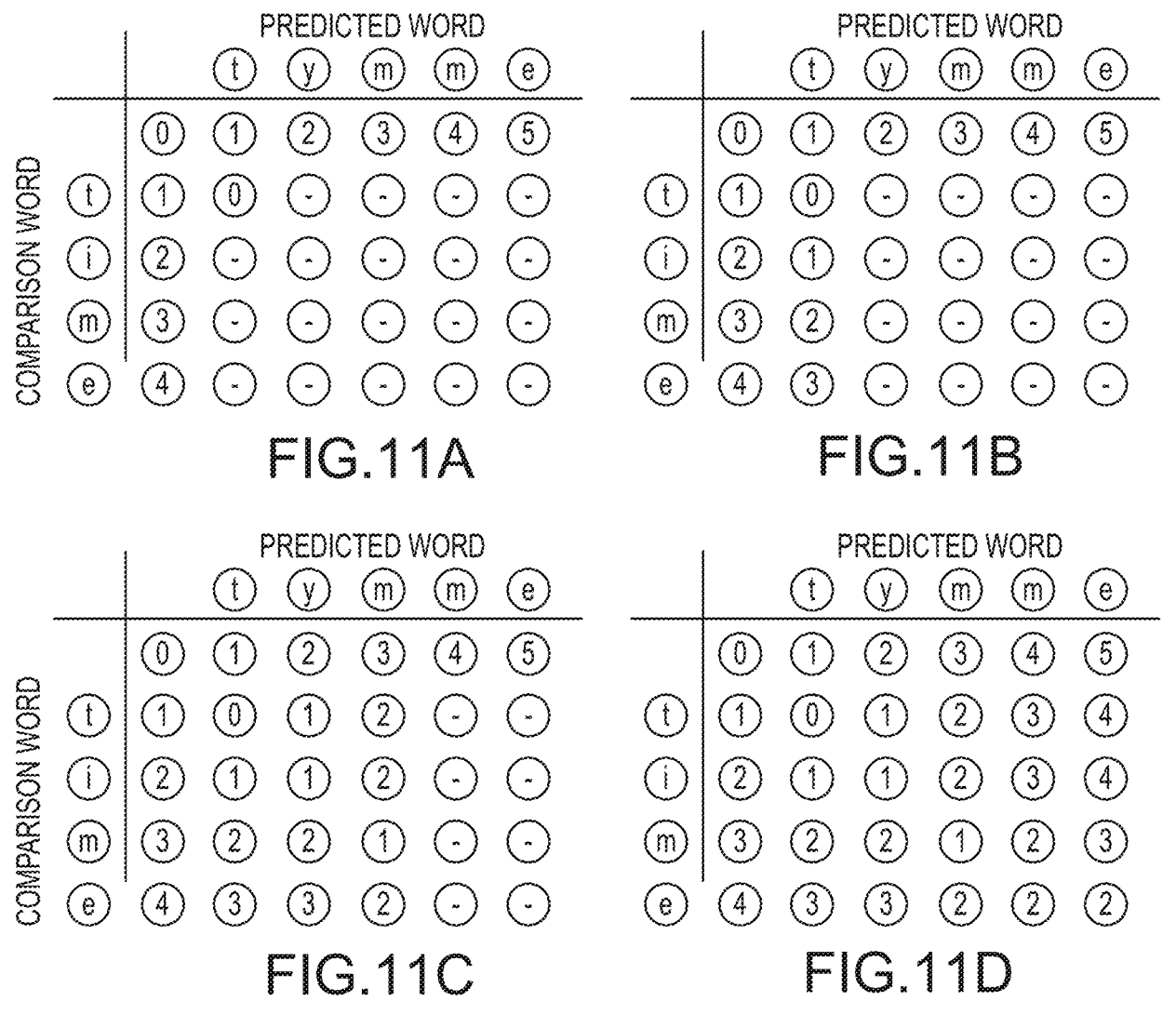

FIG. 11A is a pictorial representation of an embodiment of a statistical character error rate analysis, in accordance with embodiments of the present disclosure;

FIG. 11B is a pictorial representation of an embodiment of a statistical character error rate analysis, in accordance with embodiments of the present disclosure;

FIG. 11C is a pictorial representation of an embodiment of a statistical character error rate analysis, in accordance with embodiments of the present disclosure;

FIG. 11D is a pictorial representation of an embodiment of a statistical character error rate analysis, in accordance with embodiments of the present disclosure;

DETAILED DESCRIPTION

Figure 1:
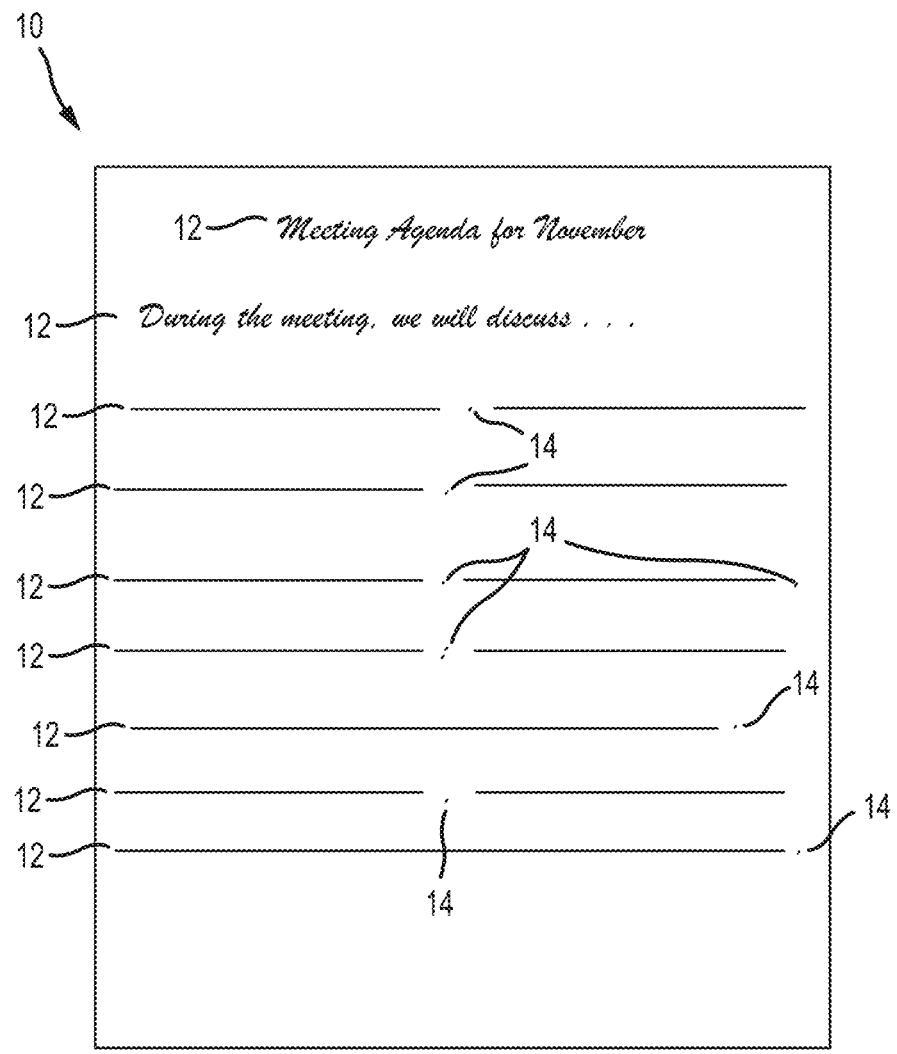
FIG. 1 is a schematic diagram of an embodiment of a handwritten document, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure relate to providing automatic handwriting character recognition using Convolutional Neural Networks (CNNs). A Fully Convolutional Neural Network (FCNN) is implemented and trained to learn and classify symbols from digitized handwriting samples. Lines of text are parsed, then word blocks (word, phone number, surname, or group of symbols) are parsed. Word blocks are first resampled to fixed height and passed into a first CNN to recognize common words. If the word block is a common word processing is done. If the word block is not a common word, the number of symbols per word block are estimated and used to warp each word block to a canonical form. The word block along with neighboring word blocks are passed into a hierarchical FCNN which utilizes information at different resolution scales to determine the sequence of symbols. The sequence of symbols are passed into a statistical based closest word match based upon Character Error Rate (CER). Word blocks are assigned probabilities to nearest words based upon a minimization of CER by adding, deleting, or substituting symbols. After all words in a sentence are extracted, a final recurrent neural network performs statistical based word corrections.

Because recognition of handwritten text is more challenging than machine generated text because of the virtually infinite ways a human can write the same message, deep learning approaches for handwriting analysis may utilize dictionary based architectures and recurrent neural networks. Embodiments of the present disclosure utilize a fully convolutional network architecture to output arbitrary length symbol streams from handwritten text. A preprocessing step normalizes input blocks to a canonical representation; which when combined with a multi-stream contextual filter architecture, negates the need for costly recurrent symbol alignment correction. When a dictionary is known, introduction of a probabilistic character error rate to correct errant word blocks is utilized. This fully convolutional method demonstrates state-of-the-art results on both dictionary based and arbitrary symbol based handwriting recognition.

Embodiments of the present disclosure include a method to obtain character based classification without relying on predefined dictionaries or contextual information. Embodiments of this method that can reliably predict both arbitrary symbols as well as words from a dictionary. In certain embodiments, this method utilizes: 1) a common CNN architecture for word identification, number of symbols in word block, and by adding multiple streams in the last few layers, to do accurate symbol prediction; 2) introduction of a probabilistic character error rate that penalizes symbol insertion and deletion more than symbol replacement; and 3) creation of a realistic block based dataset derived from the recently released NIST single character dataset. Certain embodiments of the present disclosure demonstrate state-of-the-art results on both dictionary based and arbitrary symbol based handwriting recognition benchmarks.

Embodiments of the present disclosure systems and methods for recognizing symbols from a digitized object. For example, a system architecture may provide one or more neural networks, such as Fully Convolutional Networks. In embodiments, symbols may be extracted from the digitized object via analysis and identification of whitespace separators in the image. This analysis may enable the formation of digitized line blocks. These line blocks may then be converted into one or more word blocks, the word blocks being separated by the previously identified whitespace. Thereafter, the symbols may be recognized in each word block. For instance, the word blocks may be transformed into a canonical representation of a fixed height and further evaluated by a first dictionary checker to evaluate whether or not the symbols form a common word. If so, the method may complete and output the common word. Otherwise, a word block descriptor generator may be utilized to evaluate the word block. In certain embodiments, the word block descriptor generator assigns a description indicative of a quality of the word block, such as the language the word block is written in, the script, or the like. Thereafter, the word block may be resized to canonical width spacing, where the width is based upon a prediction of the number of symbols in the word block. From there, the symbols and blanks in the word bock may be evaluated and determined. In certain embodiments, probabilistic correction may be applied. Thereafter, the determined symbols, which may have a "value" or be combined to form a word or phrase, may be output from the first dictionary checker, a symbol specific translator, or a combination thereof.

In certain embodiments, the word block descriptors include language, font, address, phone number, the case of the word block, whether numbers are present, a web address, a symbol field, a form field, a signature, or a generic document field such as title, footer, header, subtitle, or reference. Furthermore, in embodiments, the word block descriptions may include handwriting style, slant, skew, rotation, blur, marker type, paper type, image fidelity, or background threshold.

Embodiments of the present disclosure include a neural network, which may be referred to as a fourth neural network, that concatenates outputs from other neural networks to generate a prediction. In embodiments, the fourth neural network is a fully convolutional neural network. For instance, the fourth neural network may concatenate the word block predictors with the above-described resized word blocks before inputting the information into a fully connected layer. In embodiments, the second word block descriptor and the fourth neural network share one or more common layers and a single loss function.

In embodiments, a family of resized word blocks are generated. From there, the word block descriptor generator also generates a vector of attention weights associated with the family of resized word blocks. Thereafter, a single resized word block is formed as a linear combination of resized word blocks, using the generated vector attention weight. As a result, the resulting single resized word block along with the associated descriptors may be evaluated by a neural network to determine the symbols and blanks forming the word block. In embodiments, the neural network and the word block descriptor generator share one or more common layers and a single loss function. In certain embodiments, the word block descriptor generator may determine a single resized word block, from a plurality of resized word blocks, to be passed into the fourth fully convolutional neural network.

In embodiments, a family of resized word blocks are generated. The second word block descriptor generator also generates a parametric distribution of attention weights which can be applied to an arbitrary size of family of resized word blocks. A single resized word block may be formed as a linear combination of resized word blocks by using the parametric attention weights. Thereafter, the single resized word block may be combined with the word block descriptions to be evaluated by a network to determine the symbols and blanks forming the word block. In certain embodiments, the second word block descriptor also generates a parametric distribution of attention weights and shares one or more common layers and a single loss function with the fourth fully convolutional neural network.

In embodiments, multiple families of resized word blocks are generated. The second word block descriptor generator also generates a vector of attention weights for each family of resized word blocks. A single resized word block is formed as a linear combination of the multiple families of resized word blocks, each family using its own vector attention weight. Thereafter, the single resized word block along with the word block descriptors are evaluated to determine the symbols and blanks forming the word block. In an embodiment, each of the plurality of families of resized word blocks generates its own linear combination of resized word blocks, each family using its own vector attention weight, and where each of the plurality of the linear combination of resized word blocks is concatenated into a larger resized word block. The larger resized word block may be combined with the word block descriptors into a network that determines the set of symbols and blanks for each of the plurality of linear combination of resized word blocks. In embodiments, the final determination may include assigning the final symbols and blanks by weighted voting of the sets of symbols and blanks.

In embodiments, back propagation may be utilized, for example, to assign symbols and blanks to the word blocks. In certain embodiments, the assignment may include selecting the single maximum symbols and blank estimate trained through reinforcement learning.

In an embodiment, the second word block descriptor may determine a single resized word block for each family of resized word blocks, from the plurality of resized word blocks for each respective family. A second state attention vector then combines the multitude of resized word blocks from each family into one final resized word block to be passed into the fourth fully convolutional neural network. In embodiments, a hierarchy of weights for a hierarchy of families of resized work blocks is determined. This hierarchy of weights allows the combination of each of the families of resized word blocks into one final resized word block to be passed into the fourth fully convolutional neural network.

In embodiments, multiple families of resized word blocks are generated and the second word block descriptor generator also generates a parametric distribution of attention weights for each family of resized word blocks, each parametric distribution of which can be applied to an arbitrary size of family of resized word blocks. Thereafter, a single resized word block is formed as a linear combination of the multiple families of resized word blocks, each family using its own parametric attention weight. From there, the single resized word block along with the word bock descriptors is passed through the fourth fully convolutional neural networked to determine the symbols and blanks.

FIG. 1 is a schematic diagram of an embodiment of a handwritten document 10 having a plurality of lines of text 12. As illustrated in the embodiment of FIG. 1, the handwritten document 10 is directed toward a meeting agenda having the plurality of lines of text 12 arranged along various sections of the handwritten document 10. Furthermore, the handwritten document 10 includes punctuation characters 14 positioned throughout the line of text 12. For example, in the illustrated embodiment, the punctuation characters 14 include periods, commas, semi-colons, and the like. However, it should be appreciated that other punctuation characters 14, such as brackets, parentheses, exclamation points, question markets, and the like may be also utilized. Moreover, in some embodiments, symbols such as ampersands, pound signs, dollar signs, and the like may also be considered punctuation characters 14 for the purposes of analyzing and separating word blocks from the line of text 12. As will be described in detail below, the lines of text 12 of the handwritten document 10 may be analyzed and processed to separate the lines of text 12 into word blocks for further processing. As will be described below, the lines of text may include letters, symbols, numbers, special characters, or any other reasonable symbols that may be associated with handwritten text.

Figure 2:
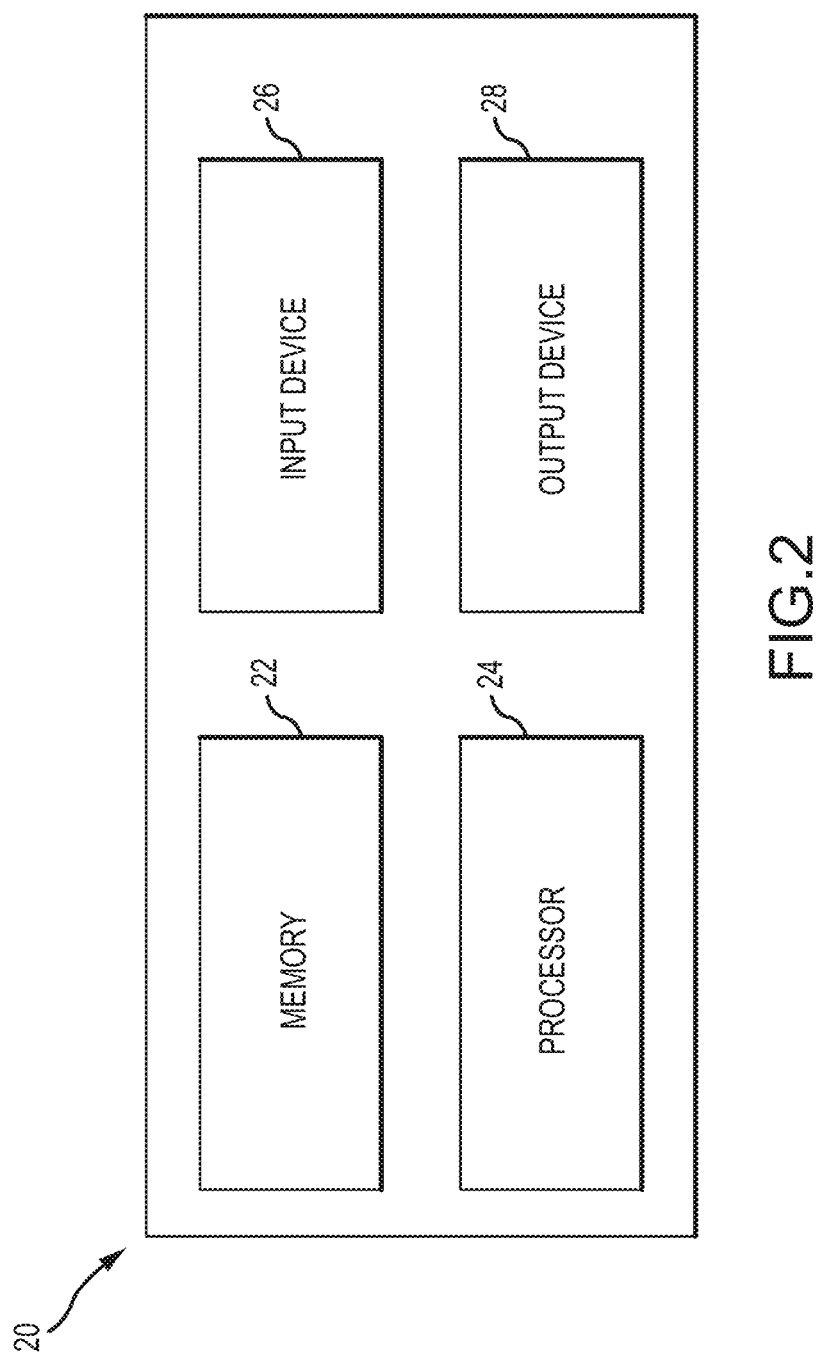
FIG. 2 is a schematic block diagram of an embodiment of a computer system, in accordance with embodiments of the present disclosure.

FIG. 2 is a schematic diagram of a computer system 20 that may be utilized to perform one or more computer operations in order to digitize an image, extract words or phrases from the image, and subsequently process the words or phrases to identify the handwritten text. In the illustrated embodiment, the computer system 20 includes a memory 22, a processor 24, an input device 26, and an output device 28. For example, in certain embodiments, the memory 22 may be a non-transitory (not merely a signal), tangible, computer-readable media, such as an optical disc, solid-state flash memory, or the like, which may include executable instructions that may be executed by the processor 24. As will be described in detail below, the memory 22 may receive one or more instructions from a user to access and execute instructions stored therein.

Furthermore, as shown in FIG. 2, the input device 26 is communicatively coupled to the memory 22 and the processor 24 and may include a photo scanner, a universal serial bus (USB) interface coupled to a device such as a personal electronic device, camera, tablet, electronic drawing pad, or the like, or other communication input device, such as an Ethernet cable. Moreover, the input device 26, in certain embodiments, may be a wireless communication device, such as a BLUETOOTH transceiver, a near-field communication transceiver, a wireless internet transceiver, or the like. In this manner, the computer system 20 is structured to receive information from devices and documents outside of the computer system 20 via the input device 26.

Additionally, in the embodiment illustrated in FIG. 2, the computer system 20 includes the output device 28. For example, the output device 28 may be a screen (e.g., a monitor) to enable the user to view and/or review information from the computer system 20. For example, the output device 28 may be utilized to perform the initial learning protocols of the CNN to enable subsequent analysis and processing of the handwritten document 10. Furthermore, the output device 28 may be utilized to interact with the computer system 20 such that the user can provide instructions to the computer system 20.

Figure 3:
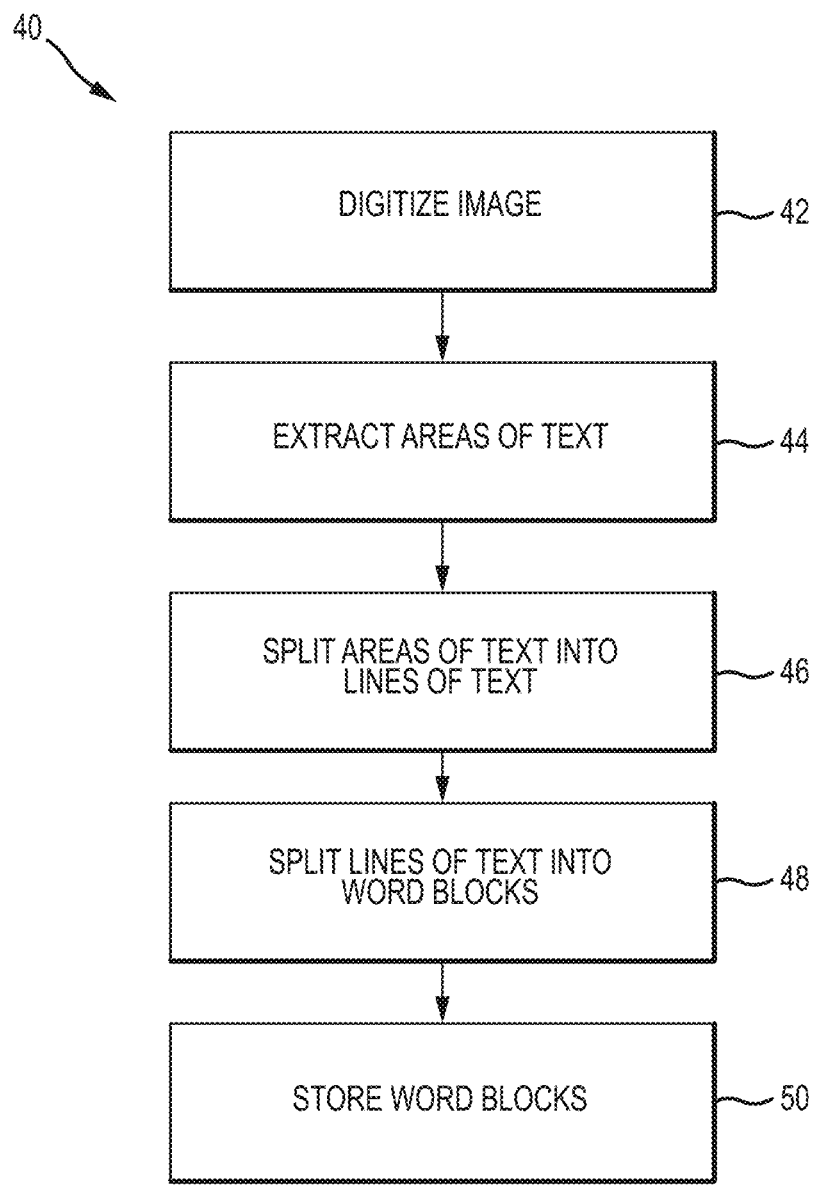
FIG. 3 is a flow chart of an embodiment of a method for extracting word blocks from a handwritten document, in accordance with embodiments of the present disclosure.

FIG. 3 is a block diagram of an embodiment of a method 40 for extracting areas of text from the handwritten document 10 into one or more word blocks. In the illustrated embodiment, the method 40 begins with obtaining a digital image (block 42), for example, via the input device 26. In certain embodiments, the user may scan a physical document, such as an invoice, a tax document, a questionnaire, or the like for storage (either permanent or temporary) in the memory 22. As such, the once physical document with handwritten text may be converted to a digital image for further processing. Moreover, in certain embodiments, the digital image may be obtained from any online content, any type of digital capture, such as a photograph or video, or the like. Next, areas of text may be extracted from the handwritten document 10 (block 44), for example, by utilizing the computer system 20. For example, regional based classifiers or pixel based segmentation may be utilized to extract areas of text from the handwritten document 10. This area of text may be referred to as a text block and contain one or more word blocks, as will be described below. Subsequently, these areas of text (e.g., text blocks, word blocks, etc.) can be utilized to determine the language of the text, the script of the text (e.g., cursive v. non-cursive), and whether the text contains letters, numbers, symbols, or a combination thereof. Then, in certain embodiments, the areas of text obtained at block 44 may be split into lines of text (block 46). For example, the area of text may be split into lines of text using modified XY trees or similar methods. Thereafter, the lines of text are separated into word blocks (block 48), for example, via modified XY trees or similar. As used herein, a word block is a string of symbols (such as letters, punctuation, numbers, special characters, or the like) separated by white space. The word block may be formed of words, phone numbers, surnames, acronyms, etc. As will be described below, the word blocks may be input into the CNN for later evaluation and identification. Accordingly, the word blocks may be stored for later use (block 50). It should be appreciated that, in certain embodiments, additional processing may be performed using one or more punctuation detectors to detect and store a string of word blocks to form sentences, and in certain embodiments, paragraphs through the detection and storage of the sentences. In this manner, text can be separated and isolated for later processing via the CNN. Furthermore, in embodiments, the word blocks, sentences, paragraphs, or the like may extend over multiple lines or pages.

In certain embodiments, the CNN may be referred to as a Fully Convolutional Network (FCN). Moreover, in certain embodiments, the FCN may be a variant of a Visual Geometry Group (VGG) CNN network. For example, one or more groups of (3×3 filter) convolution layers are separated by pooling operations. The input word block is first passed into a first CNN which predicts a word along with the number of symbols, N in the word block. FIG. 4 is a schematic diagram illustrating the baseline architecture used. Starting with the input layer, the architecture is C(64)-C(64)-C(64)-P(2)-C(128)-C(128)-P(2)-C(256)-C(256)-P(2)-C(512)-C(512)-C(1024, 4×4, 1×2)-C(1024, 3×9, 0×4)-C(111, 1×1, 0×0), where C(d, h×w, $pad_h$×$pad_w$) indicates a convolutional layer with d filters of spatial size h×w (default 3×3) of stride 1 with $pad_h$×$pad_w$ padding (default 1×1) and P(s) is a s×s pooling layer of stride s.

Figure 4A:
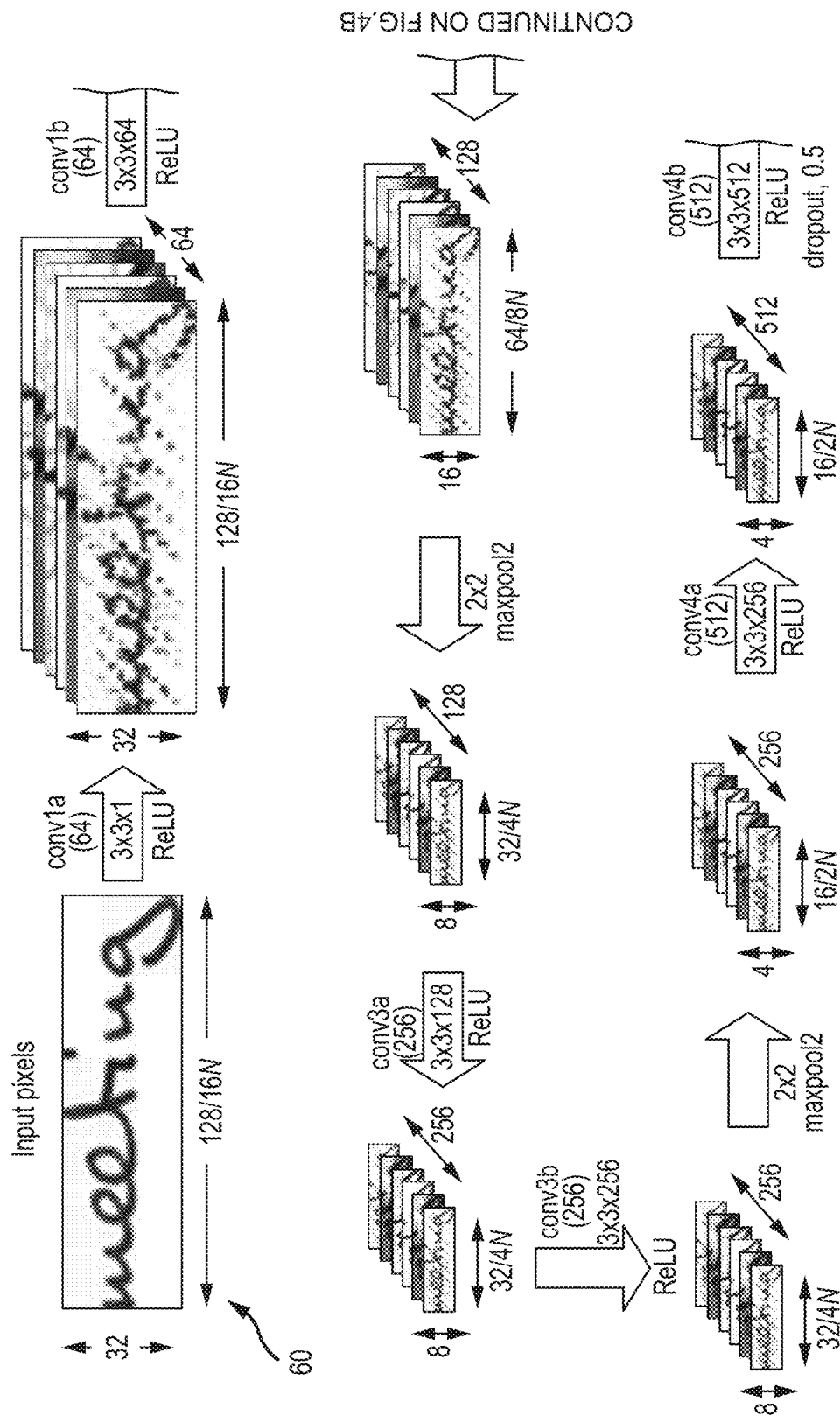
FIG. 4A is a schematic diagram of an embodiment of baseline architecture of a convolutional neural network (CNN), in accordance with embodiments of the present disclosure.
Figure 4B:
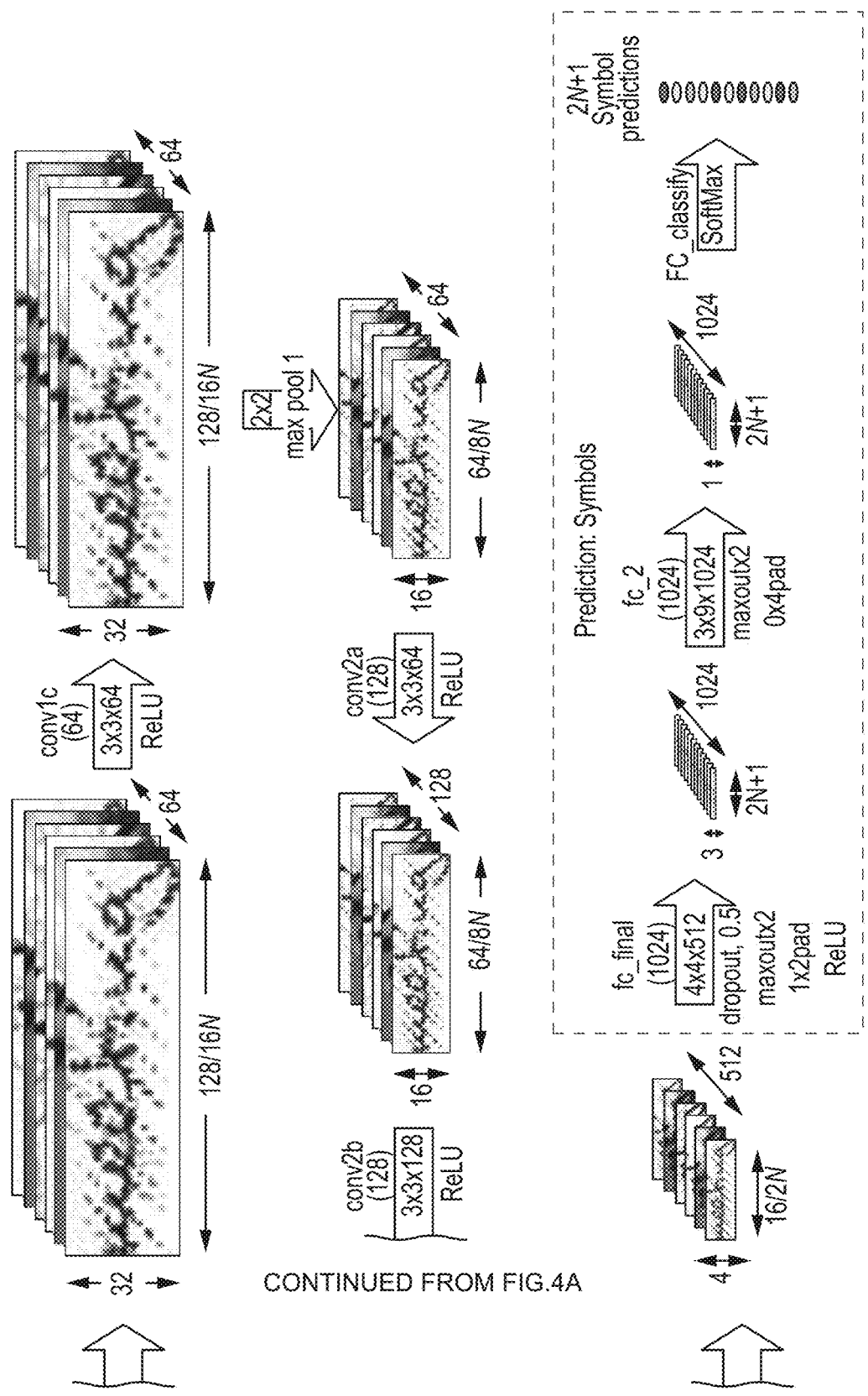
FIG. 4B is a schematic diagram of an embodiment of baseline architecture of a convolutional neural network (CNN), in accordance with embodiments of the present disclosure.

In the embodiment illustrated in FIGS. 4 and 4B, a word block 60 is the input that is directed into the CNN. In the illustrated embodiment, the word block 60 may be an input image of 32×128×1 (imageHeight×imageWidth×imageDepth). The default architecture reduces a 32×16N input image to a (2N+1)×111 prediction, where 111 is the number of symbols (which may include upper and lower English and French alphabets, digits, and special characters).

With respect to FIGS. 4 and B, a convolution layer is the application of a convolution filter onto an input image. For example, conv1a, the first convolution operation is a 3×3×1 (filterHeight×filterWidth×filterDepth) filter. If the input image were 32×128×1 (imageHeight×imageWidth×imageDepth) (32×16N×1 in certain embodiments), a convolution operation would result in a 30×126×1 image. The change in dimension is because to apply a 3×3 filter, the first, last, left-most, and right-most pixels are skipped. The change in size is inconvenient. To avoid this inconvenience, the input image can be padded with zeros before convolution. The default padding of 1×1 says to add '1' row of zeroes along the top and bottom and '1' column of zeroes on the left and right. With this padding the input image height and width of 32×128 (32×16N in certain embodiments) remains unchanged after a 3×3 filter. There are 64 conv1a filters, each outputs a 32×128 image (32×16N in certain embodiments), which is called an activation map. After conv1a, there is a 32×128×64 image (32×16N×64 in certain embodiments). The next convolution operation, conv1b is also a 3×3 filter, but the depth changed to match the depth of its input image, which is 64 in this case, thus the filters in conv1b are 3×3×64. Padding once again adds a row of zeros to the top and bottom and a column of zeroes on the left and right. After padding, an image of 34×130×64 is convolved with 3×3×64 filters. Each filter yields a single 32×128 activation map (image). There are 64 conv1b filters, so the output of this stage is a 32×128×64 image (32×16N×64 in certain embodiments), which is the stacking of all 64 activation maps into a single image.

Pooling reduces the width and height of a stack of activation maps, but not the depth. For example, the max pool 1 operation, reduces the image from 32×128×64 (32×16N×64 in certain embodiments) to 16×64×64 image (16×8N×64 in certain embodiments). One way of accomplishing pooling is to resample the image using nearest neighbor, linear, cubic, etc. filtering. Another method is to use max pooling. Max pooling assigns an output pixel as the maximum (in terms of pixel code value) from a receptive field of pixels. Pooling with a s×s pooling layer of stride s reduces the width and height by a factor of s. If s=2, each 2×2 region of an input image is reduced to a single pixel, where the pixel code value is the maximum code value of the input 2×2 region.

Non-linear operations are inserted between layers of a CNN. Just like a series of matrix multiples can be replaced with a single matrix operation, a series of CNN layers could be approximated with a single layer. By inserting non-linear layers, CNNs can approximate more complex functions. The Rectified Linear Unit, or ReLU, is the non-linear embodiment utilized in FIGS. 4A and 4B. The ReLU operation replaces all input values less than zero equal to zero, while leaving all positive inputs unchanged.

After applying the series of convolutions and pooling operations in FIG. 4, the resulting resolution of the image passed into the prediction layer is 4×16×512 or 4×2N×512, depending on if the input image were 32×128×1 or 32×16N×1.

In embodiments conducting symbol prediction, a 4×2N×512 image is input into the fc_final. Fc_final learns 1024 4×4×512 filters. If fc_final is applied without padding, each of the 1024 filters would generate a 1(2N−3)×1 image. However, in embodiments, it is desirable for each filter to generate a 1×(2N+1)×1 image, such that N symbols are predicted interleaved with N+1 blanks with the first and last prediction being a blank. By adding a column zero pad of width 2 the left and right of the input activation maps to fc_final, a 1×(2N+1)×1 image after filtering is obtained. To make the code more robust to vertical registration error, embodiments may desire the output of fc_final to be 3×(2N+1)×1 image, with three sets of N symbols being predicted (each set would also have N+1 blanks). This can be accomplished by adding a single zero pad row before and after the image. As such, the padding for fc_final is referred to as 1×2 for 1 row of zeros at the top and bottom, and 2 columns of zeros to the left and right, The input to fc_2 is 3×(2N+1)×1024, and it may be desirable, in embodiments, for the output to be 1×(2N+1)×1024. The receptive field of fc_2 should be wide to account for any blank alignment errors. As such, an embodiment uses a wide filter, such as 3×9, where the filter height of 3 would reduce the input image of height 3 to an output image of height 1, and the filter width of 9 would have a receptive field that is tolerant to left-to-right blank alignment errors. Similar to the processing of fc_final, padding on the top/bottom of the input to fc_2 may be desirable, but without any left/right padding, each of the 1024 filters in fc_2 would generate a 1×(2N−7)×1 image. To get a desirable width of 2N+1, embodiments may add a zero pad of 4 columns to the left and right of all activation maps feeding fc_2. As such, each filter from fc_2 generates a 1×(2N+1)×1 image, and since embodiments of the system learn 1024 filters, the output of fc_2 is 1×(2N+1)×1024, where each of the 1024 predictions is 2N+1 long, which is N symbols, each separated by a blank. This 1×(2N+1)×1024 is then fully connected to a 1024×111 layer, giving 2N+1 symbol predictions. Each of these 2N+1 symbol predictions has 111 output nodes, each of which can be turned into 1 out of 111 symbols using softmax.

Figure 5:
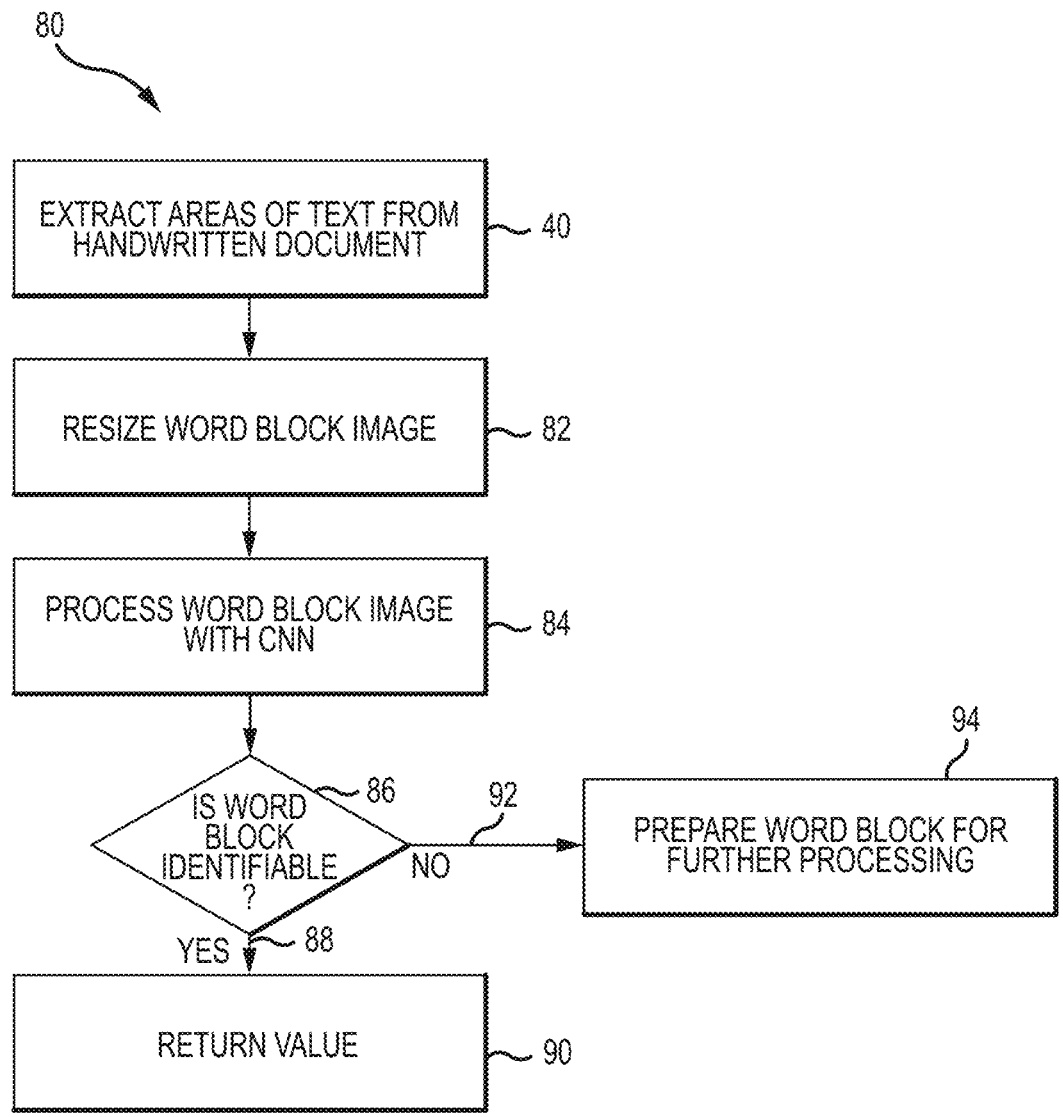
FIG. 5 is a flow chart of an embodiment of a method for processing word blocks with a CNN, in accordance with embodiments of the present disclosure.

In certain embodiments, a first CNN, such as the CNN depicted in FIG. 4, may be used to identify the word block. FIG. 5 is a flow chart of an embodiment of a method 80 to evaluate word blocks with a dictionary CNN to determine the hand written text of the word block 60. The method 80 begins with the method 40 for extracting areas of text described above in FIG. 3. For example, the handwritten document 10 will be digitized and processed to generate word blocks 60. Next, the word block 60 will be resized (block 82). For example, in certain embodiments, the word block 60 will be resized to 32×128. As a result, different sized word blocks 60 may be evaluated using the same, or substantially the same, CNN without taking the size of the text into account. Thereafter, the word block 60 is processed by the CNN, for example, the CNN similar to the CNN described in FIGS. 4 and 4B (block 84). This first CNN can either predict which word from a dictionary has been input, the length of the word, or both. Thereafter, the word block 60 is analyzed to determine if the characters and/or features forming the word block 60 are identifiable (operator 86). For example, in certain embodiments, the CNN may include a dictionary or lexicon containing a database of common words (e.g., the 500 most common words in a language, the 600 most common words in a language, the 700 most common words in a language, the 800 most common words in a language, the 900 most common words in a language, or any suitable size database of common words). As the word block 60 is processed by the CNN, the results may be evaluated against the database of common words to determine if further processing is necessary. For example, if the word block 60 is identifiable (line 88), the value found in the dictionary is returned as an output (block 90). However, if the word block 60 is not identifiable (line 92), the word block 60 is prepared for further processing, for example, in another CNN (block 94). It should be appreciated that, in certain embodiments, the other CNN may be the same, or substantially the same, CNN that previously processed the word block 60, however, with a different input size or output predictor, such as determining the number of symbols in the word block 60. In this manner, handwritten text from handwritten documents 10 may be evaluated and processed.

In certain embodiments, as described above, the CNN may include one or more convolutional steps, one or more non linearity steps, and/or one or more pooling steps in order to process the word block 60. One architecture for lexicon prediction is C(64)-C(64)-C(64)-P(2)-C(128)-C(128)-P(2)-C(256)-C(256)-P(2)-C(512)-C(512)-FC(2018)-Dropout (0.5)-FC(V) and for length prediction is C(64)-C(64)-C(64)-P(2)-C(128)-C(128)-P(2)-C(256)-C(256)-P(2)-C(512)-C(512)-FC(256)-FC(64)-Dropout(0.5)-FC(d), where FC(x) is a fully-connected layer with x filters. For lexicon prediction, V is the size of the dictionary. For length prediction, d=32, giving 32 classes; able to predict sequence lengths from 1-32.

It should be appreciated that, in certain embodiments, while performing the method 80 described in FIG. 5, certain parameters and/or confidences may be evaluated to determine if the word block 60 is identifiable. For example, if the confidence of this first CNN is greater than $\tau$, the word block 60 has been deciphered and the program exits, as described above. If the confidence is less than $\tau$, the word block is resampled to 32×16N pixels, where N is the number of symbols reported from the first CNN. This resampled word block is input to a second CNN. In certain embodiments, this second CNN is the fully convolutional version of the CNN illustrated in FIG. 4. For example, a function such as SymLength may be utilized, which is the number of unique characters in the alphabet (upper/lower case, numbers, punctuation, etc.), and is 96 by default for English recognition. However, it should be appreciated that the SymLength may be any number of unique characters, such as 80, 90, 100, 200, 300, 400, or any suitable number.

Figure 6A:
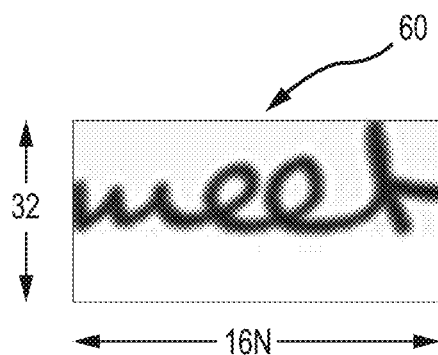
FIG. 6A is a pictorial representation of an embodiment of a word block after pooling and resizing, in accordance with embodiments of the present disclosure.
Figure 6B:
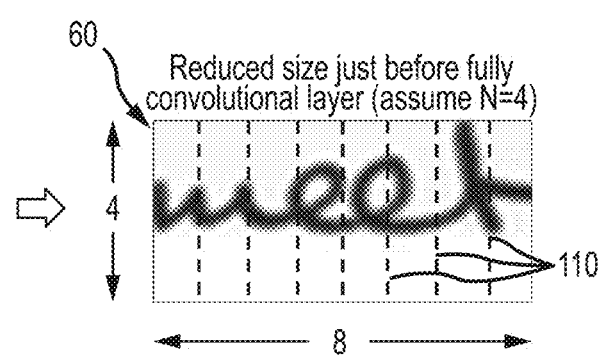
FIG. 6B is a pictorial representation of an embodiment of a word block after pooling and resizing, in accordance with embodiments of the present disclosure.
Figure 6C:
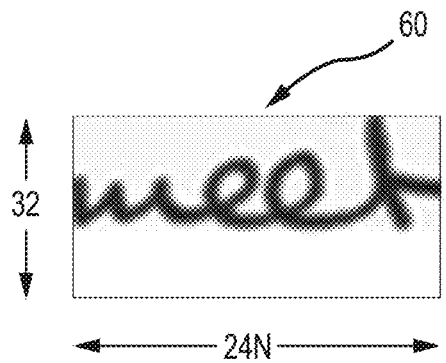
FIG. 6C is a pictorial representation of an embodiment of a word block after pooling and resizing, in accordance with embodiments of the present disclosure.
Figure 6D:
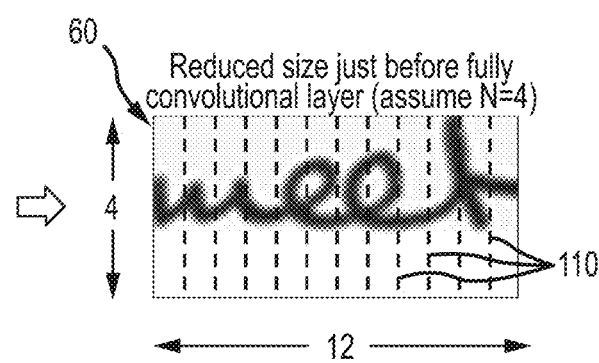
FIG. 6D is a pictorial representation of an embodiment of a word block after pooling and resizing, in accordance with embodiments of the present disclosure.

FIGS. 6A-6D are pictorial representations of an embodiment of the word "meet" as hand written text of a word block 60 after pooling and resizing. In the illustrated embodiment, FIG. 6A shows the word "meet" having a size of 32×16N pixels, although it should be appreciated that, in certain embodiments, the size of the word block 60 may be different. Thereafter, FIG. 6B illustrates the word block 60 after processing within the CNN described above. In the illustrated embodiment, N is assumed to be 4 because FIG. 6A illustrates 4 different characters in the word block 60. Moreover, the size of the word block 60 is 4×8 (e.g, 4×2N where N is 4). As shown, the dashed lines 110 break the image into 8 sections along the longitudinal axis. Furthermore, in certain embodiments, as illustrated in FIGS. 6C and 6D, the word block 60 may be output as a 32×24N imagine that is processed to a 4×12 image. As a result, FIG. 6D illustrates the dashed lines 110 breaking the image into 12 sections along the longitudinal axis. In this manner, the word block 60 may be prepared for filtering.

Figure 7A:
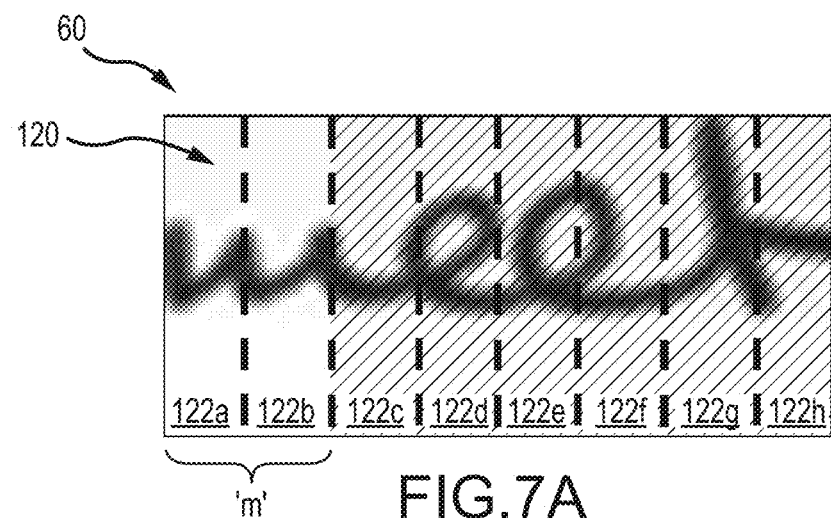
FIG. 7A is a pictorial representation of an embodiment of a receptive field of a two tap even filter across a word block, in accordance with embodiments of the present disclosure.
Figure 7B:
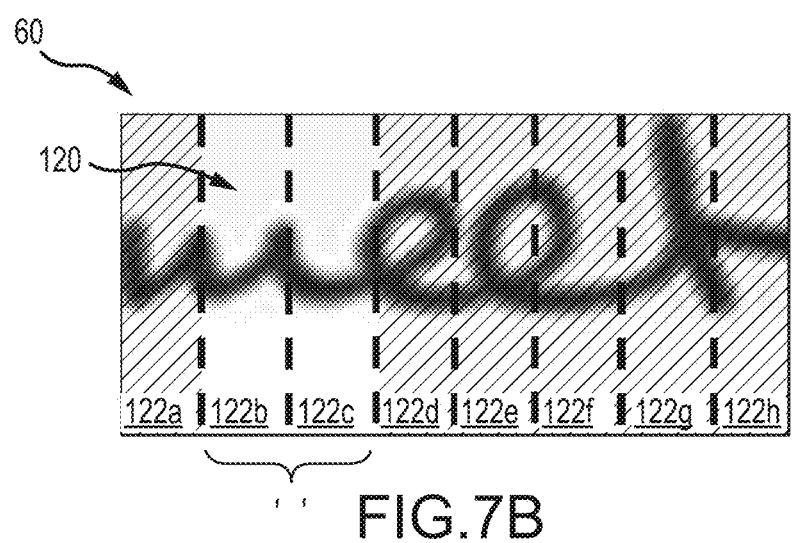
FIG. 7B is a pictorial representation of an embodiment of a receptive field of a two tap even filter across a word block, in accordance with embodiments of the present disclosure.
Figure 7C:
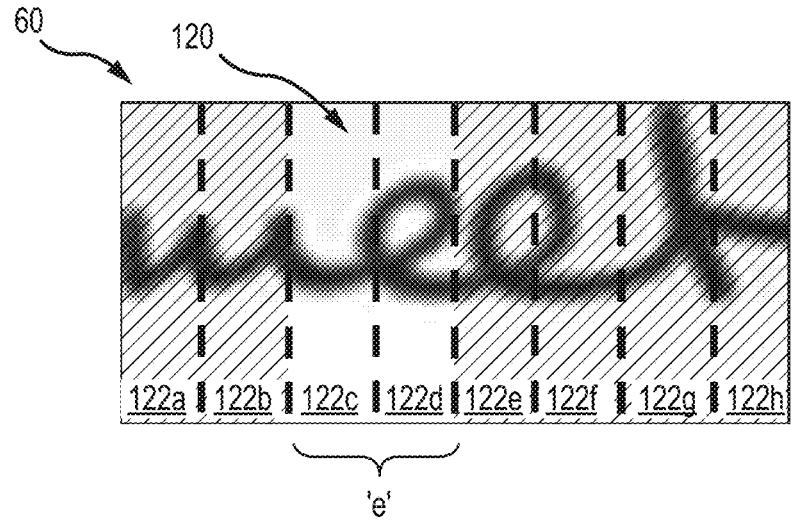
FIG. 7C is a pictorial representation of an embodiment of a receptive field of a two tap even filter across a word block, in accordance with embodiments of the present disclosure.
Figure 7D:
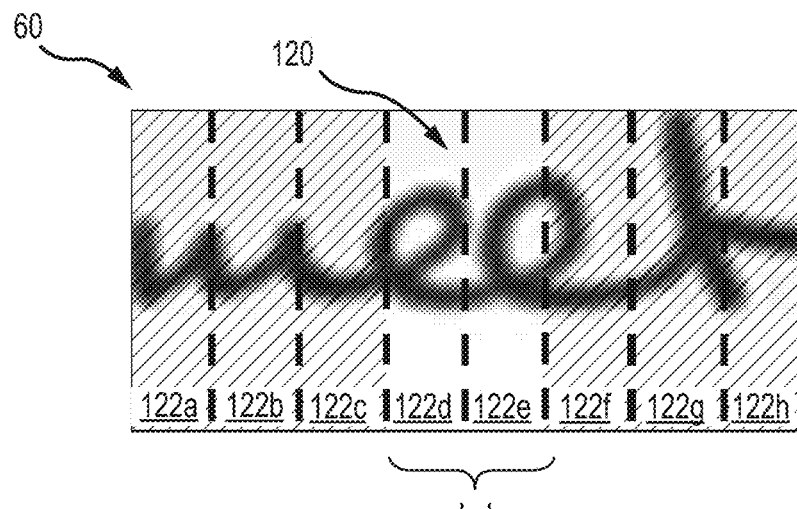
FIG. 7D is a pictorial representation of an embodiment of a receptive field of a two tap even filter across a word block, in accordance with embodiments of the present disclosure.
Figure 7E:
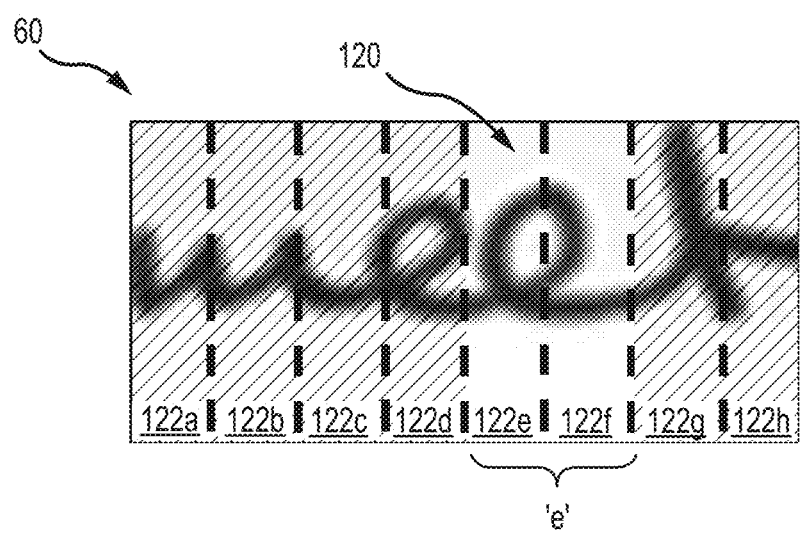
FIG. 7E is a pictorial representation of an embodiment of a receptive field of a two tap even filter across a word block, in accordance with embodiments of the present disclosure.
Figure 7F:
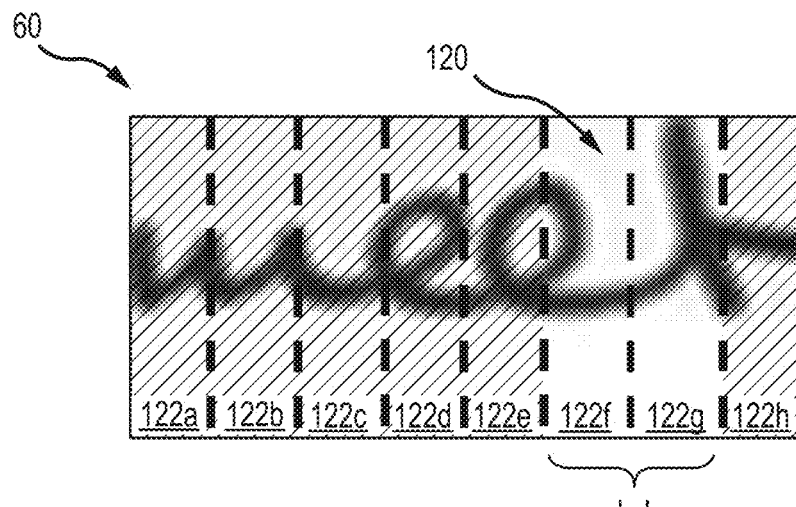
FIG. 7F is a pictorial representation of an embodiment of a receptive field of a two tap even filter across a word block, in accordance with embodiments of the present disclosure.
Figure 7G:
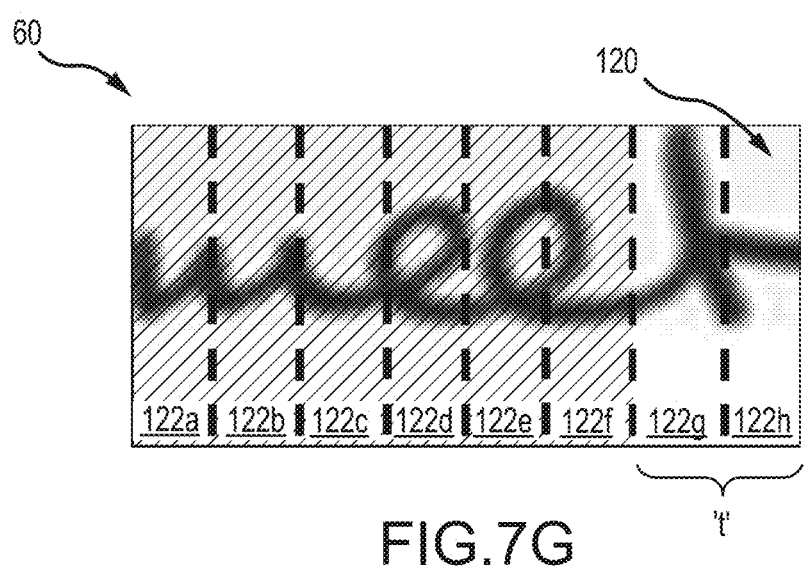
FIG. 7G is a pictorial representation of an embodiment of a receptive field of a two tap even filter across a word block, in accordance with embodiments of the present disclosure.

FIGS. 7A-7G are pictorial representations of a receptive field of a two tap even filter 120 stepping across a 16N wide word block 60. As shown in FIGS. 7A-7G, on average, the filter 120 is centered on a symbol of a blank. That is, as the filter 120 transitions along the word block 60 between the regions 122 separated by the dashed line 110, the filter 120 is either centered over a letter (for example, as shown in FIG. 7A, the letter "m") or over a blank space, as shown in, for example, FIG. 7B. As described above, in certain embodiments, the stride illustrated in FIG. 7 is one. As a result, in FIG. 7A, the filter 120 is over the regions 122a and 122b. Thereafter, in FIG. 7B, the filter 120 is over the regions 122b and 122c. Accordingly, the filter 120 passes over the word block 60 such that each respective region 122 is evaluated by the filter 120. In this manner, the word block 60 can be processed by the CNN to determine the characters forming the word block 60.

Figure 8A:
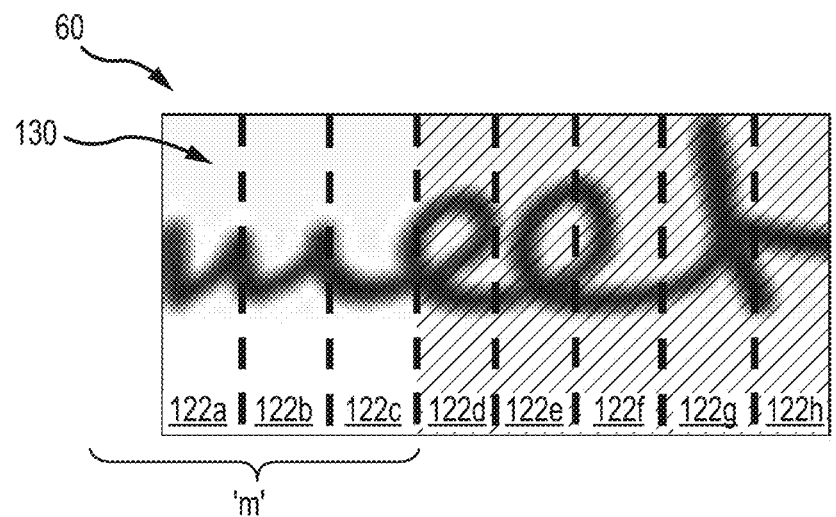
FIG. 8A is a pictorial representation of an embodiment of a four tap even filter across a word block, in accordance with embodiments of the present disclosure.
Figure 8B:
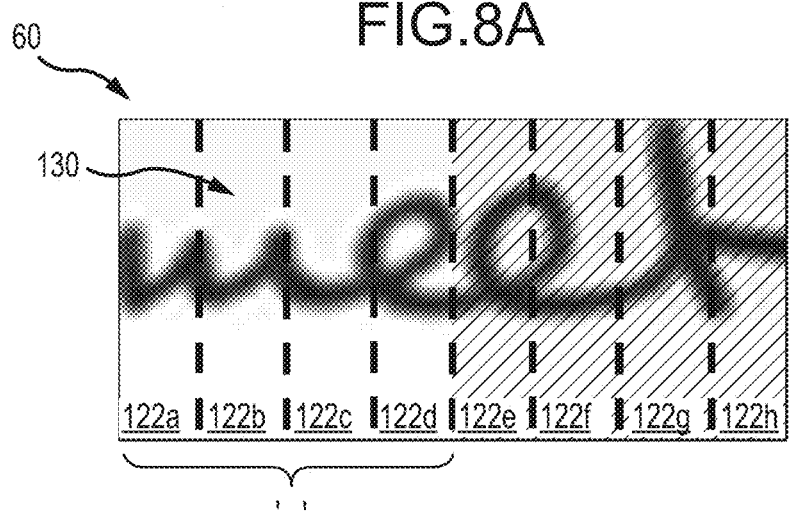
FIG. 8B is a pictorial representation of an embodiment of a four tap even filter across a word block, in accordance with embodiments of the present disclosure.
Figure 8C:
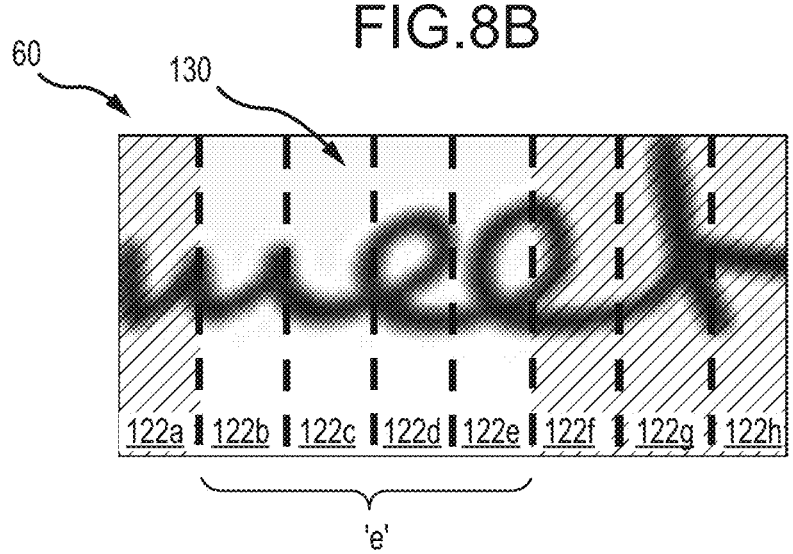
FIG. 8C is a pictorial representation of an embodiment of a four tap even filter across a word block, in accordance with embodiments of the present disclosure.
Figure 8D:
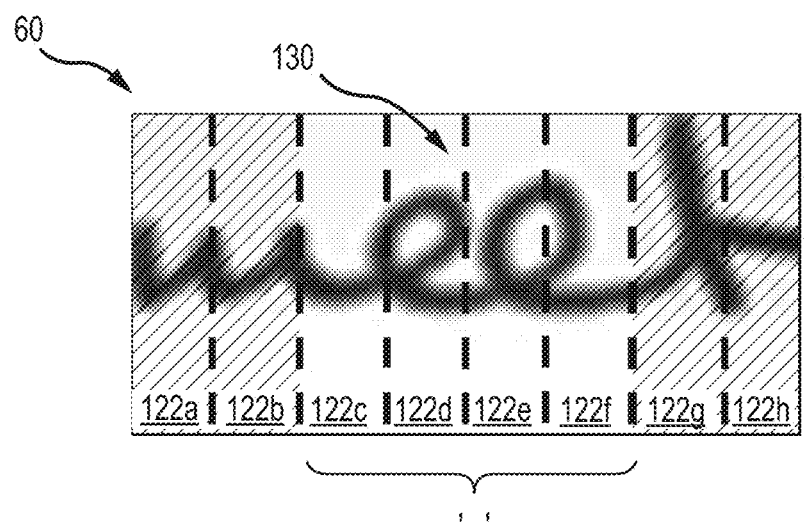
FIG. 8D is a pictorial representation of an embodiment of a four tap even filter across a word block, in accordance with embodiments of the present disclosure.
Figure 8E:
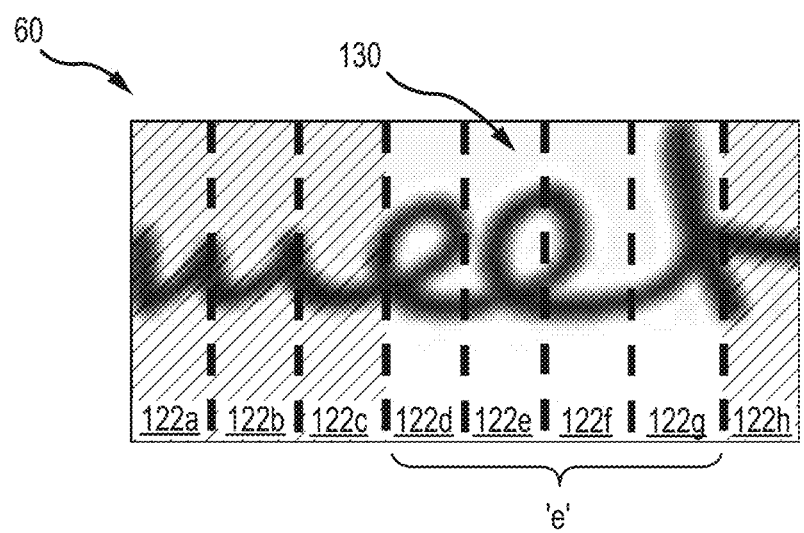
FIG. 8E is a pictorial representation of an embodiment of a four tap even filter across a word block, in accordance with embodiments of the present disclosure.
Figure 8F:
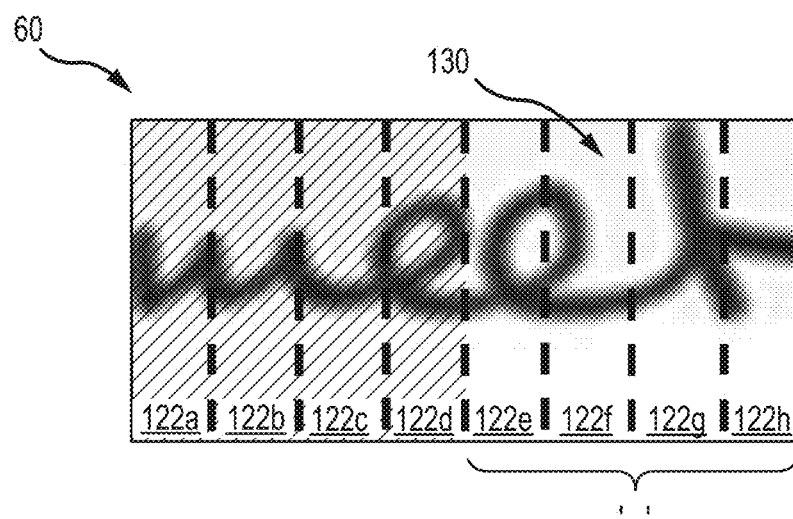
FIG. 8F is a pictorial representation of an embodiment of a four tap even filter across a word block, in accordance with embodiments of the present disclosure.
Figure 8G:
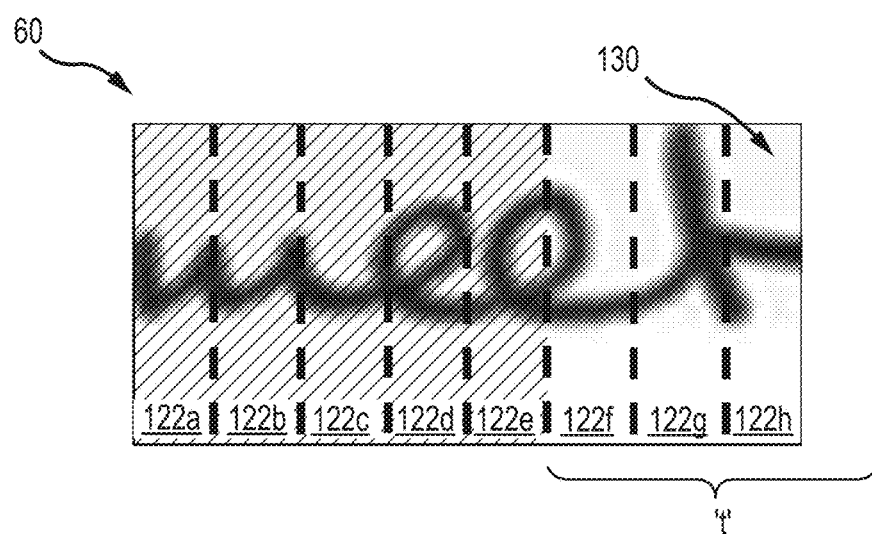
FIG. 8G is a pictorial representation of an embodiment of a four tap even filter across a word block, in accordance with embodiments of the present disclosure.

FIGS. 8A-8G are pictorial representations of a receptive field of a four tap even filter 130 stepping across the same 16N wide word block 60 shown in FIGS. 7A-7G. In the illustrated embodiment, on average, the filter 130 is centered on a symbol or a blank. As shown in FIG. 8A, the four tap even filter 130 includes padding to filter the left-most and right-most symbols forming the word block 60. Padding is utilized to allow filtering on left-most and right-most symbols. In the illustrated embodiment, a pad of Fw/2−1 is used on either side of the block word, where Fw is the width of the filter. The resulting even convolution filter will center or substantially center on N symbols and N−1 blanks as it steps across the word block. For example, a 4×4×512 filter would result in a buffer width of 2N−1. That is, in certain embodiments, the filter 130 may extend beyond the width of the word block 60. As shown in FIG. 8A, the filter 130 is positioned over the regions 122a, 122b, and 122c and therefore recognizes the letter "m" from the word block 60. Similarly to the filter 120 utilized in the embodiment described in FIG. 7, the filter 130 has a stride of 1, and therefore FIG. 8(b) illustrates the filter 130 positioned over the regions 122a, 122b, 122c, and 122d. Additionally, in FIG. 8(b), the filter 130 returns a blank. As such, the filter 130 will center on N symbols and N−1 blanks as it steps across the word block 60. Accordingly, as the filter 130 moves across the word block 60, the characters forming the word block 60 are subsequently evaluated and recognized, thereby enabling the CNN to determine the characters forming the word block 60.

Figure 9A:
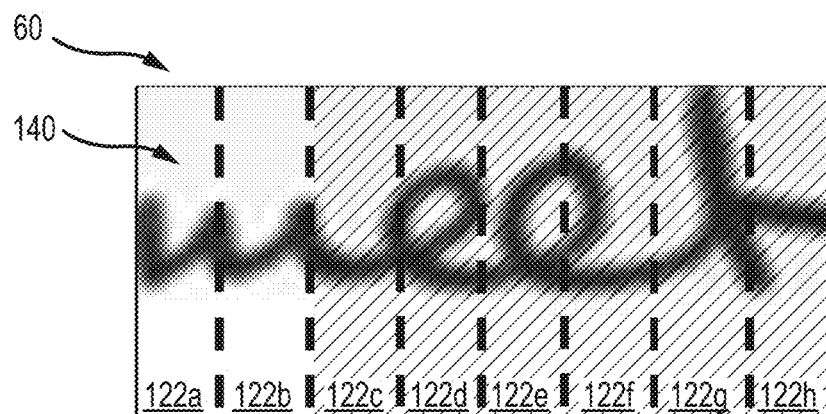
FIG. 9A is a pictorial representation of an embodiment of a 3-wide odd filter across a word block, in accordance with embodiments of the present disclosure.
Figure 9B:
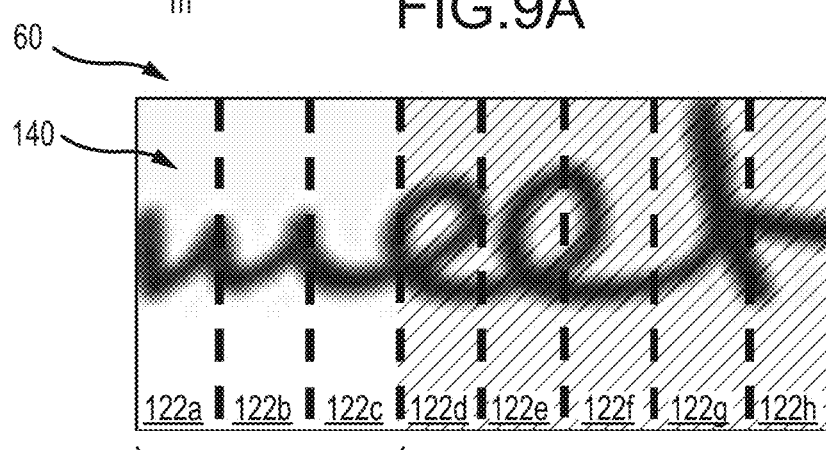
FIG. 9B is a pictorial representation of an embodiment of a 3-wide odd filter across a word block, in accordance with embodiments of the present disclosure.
Figure 9C:
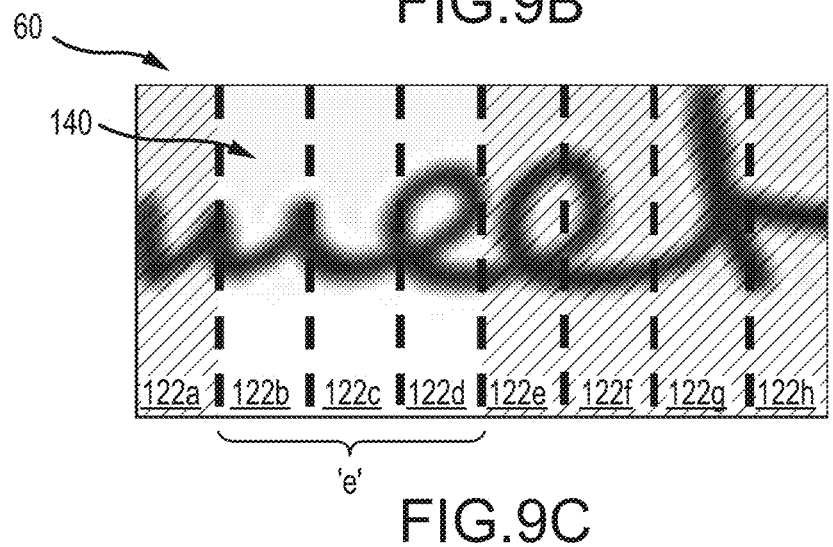
FIG. 9C is a pictorial representation of an embodiment of a 3-wide odd filter across a word block, in accordance with embodiments of the present disclosure.
Figure 9D:
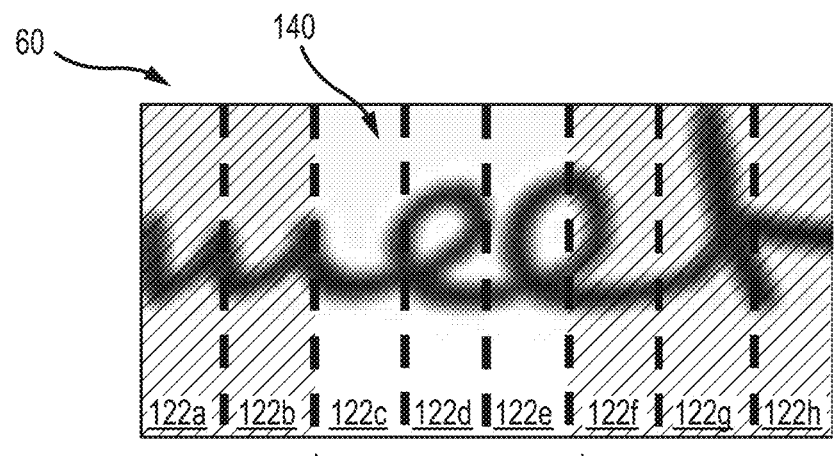
FIG. 9D is a pictorial representation of an embodiment of a 3-wide odd filter across a word block, in accordance with embodiments of the present disclosure.
Figure 9E:
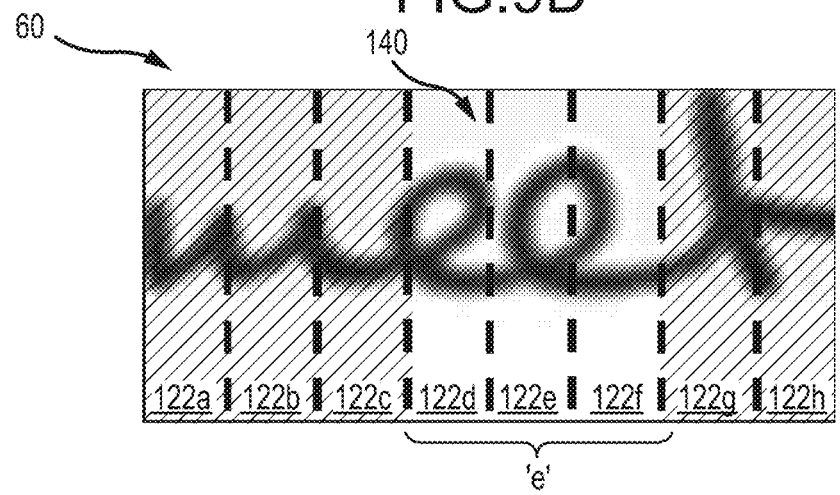
FIG. 9E is a pictorial representation of an embodiment of a 3-wide odd filter across a word block, in accordance with embodiments of the present disclosure.
Figure 9F:
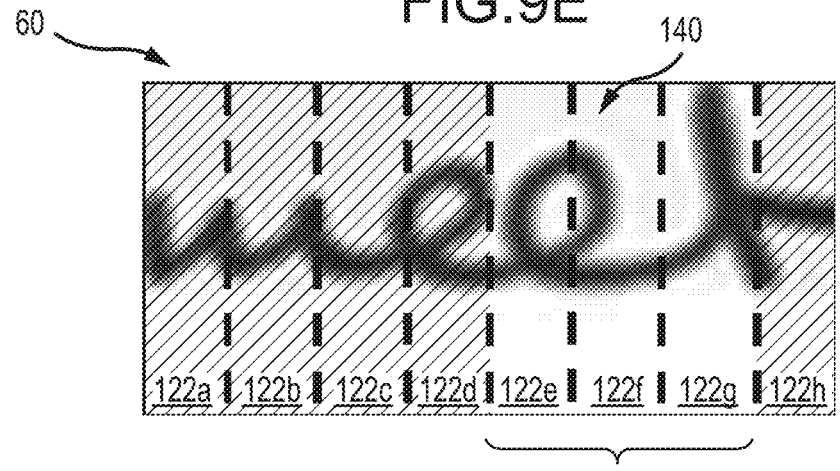
FIG. 9F is a pictorial representation of an embodiment of a 3-wide odd filter across a word block, in accordance with embodiments of the present disclosure.
Figure 9G:
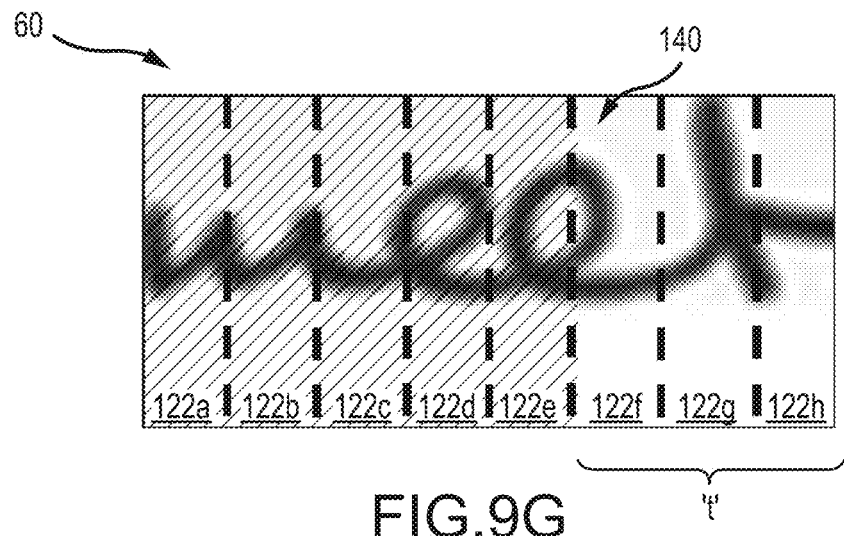
FIG. 9G is a pictorial representation of an embodiment of a 3-wide odd filter across a word block, in accordance with embodiments of the present disclosure.
Figure 9H:
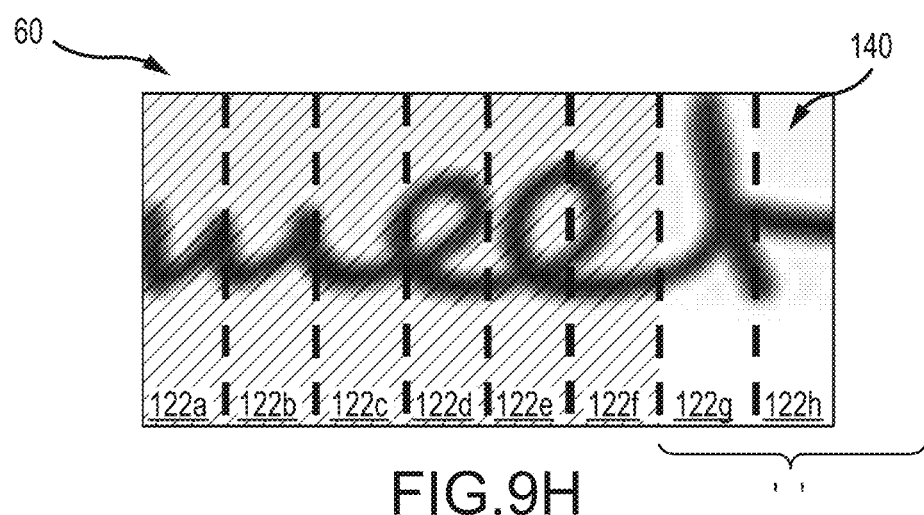
FIG. 9H is a pictorial representation of an embodiment of a 3-wide odd filter across a word block, in accordance with embodiments of the present disclosure.
Figure 10A:
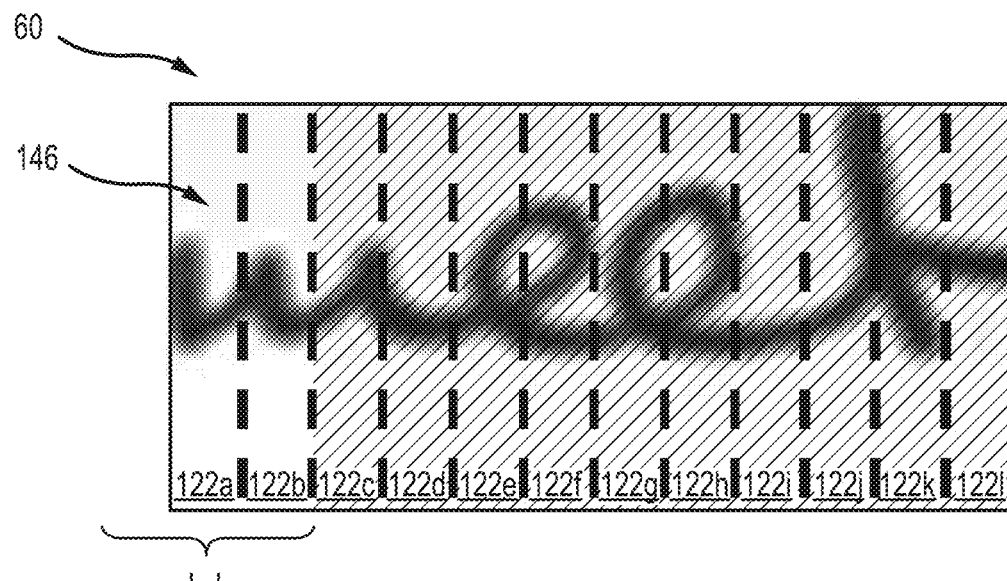
FIG. 10A is a pictorial representation of an embodiment of a 3-wide odd filter across a word block, in accordance with embodiments of the present disclosure.
Figure 10B:
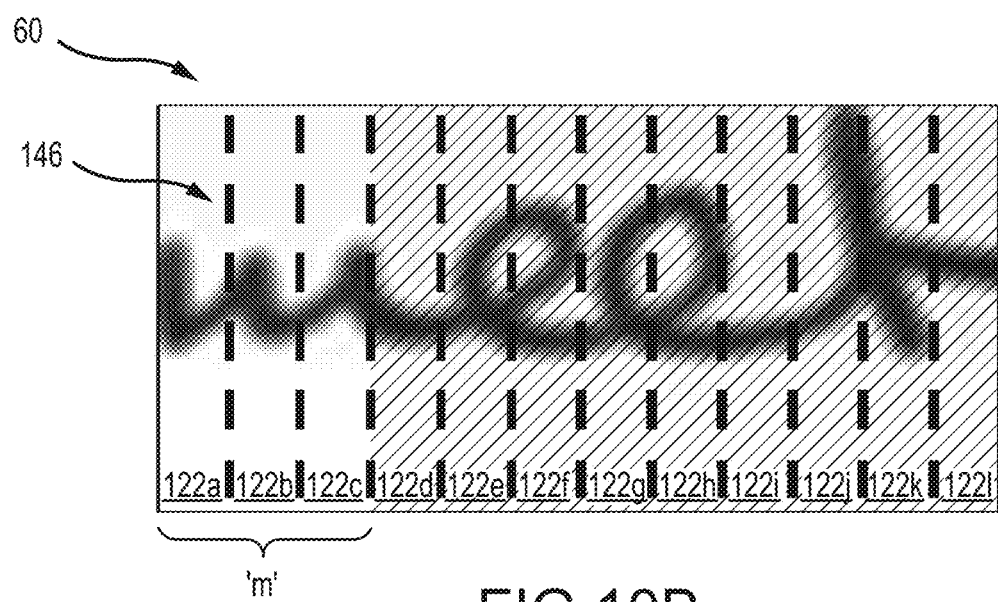
FIG. 10B is a pictorial representation of an embodiment of a 3-wide odd filter across a word block, in accordance with embodiments of the present disclosure.
Figure 10C:
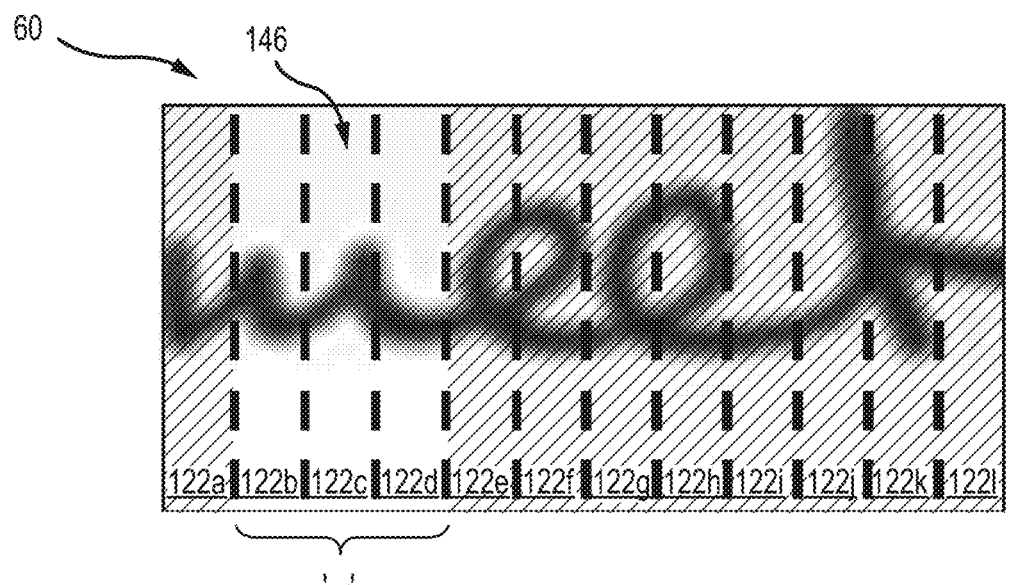
FIG. 10C is a pictorial representation of an embodiment of a 3-wide odd filter across a word block, in accordance with embodiments of the present disclosure.
Figure 10D:
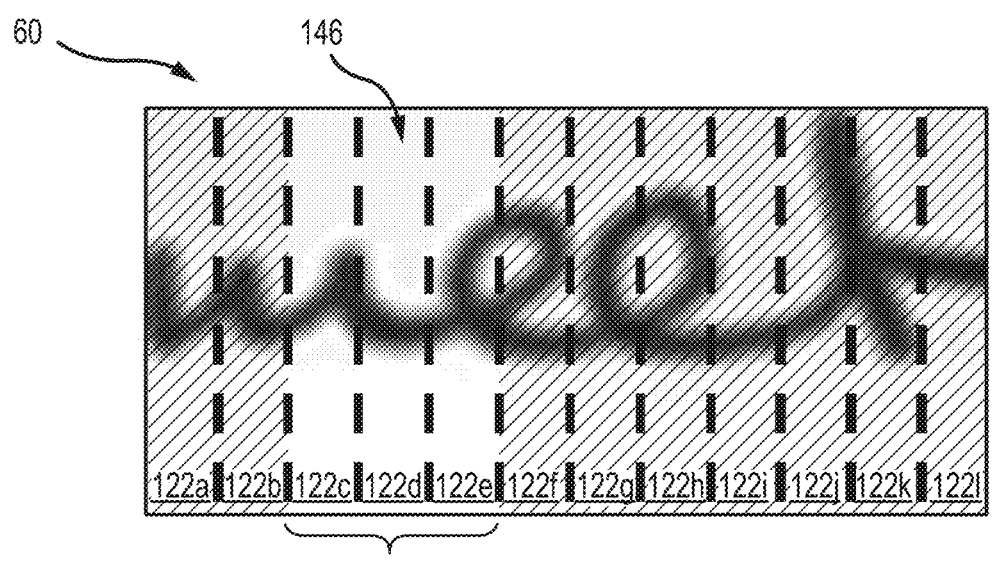
FIG. 10D is a pictorial representation of an embodiment of a 3-wide odd filter across a word block, in accordance with embodiments of the present disclosure.
Figure 10E:
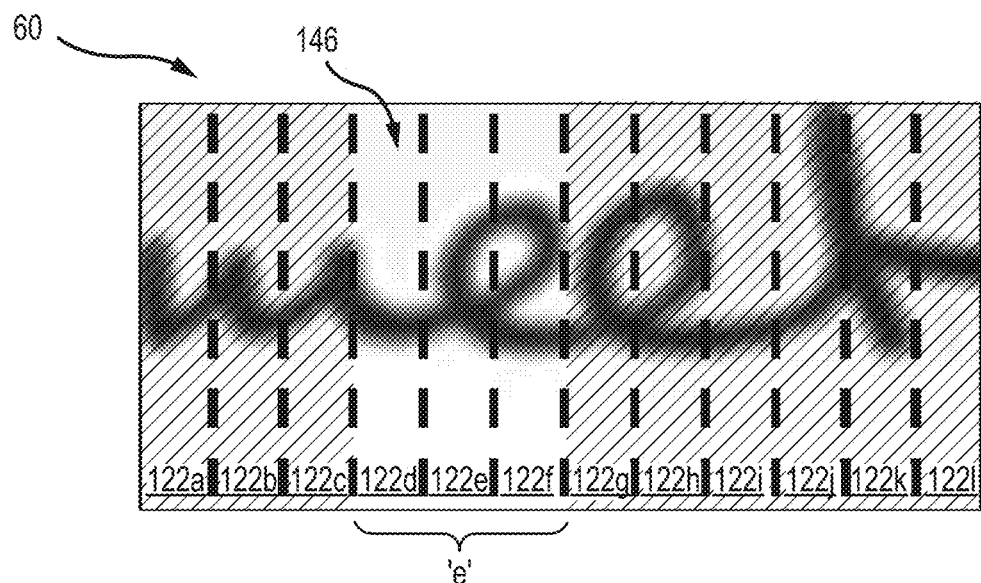
FIG. 10E is a pictorial representation of an embodiment of a 3-wide odd filter across a word block, in accordance with embodiments of the present disclosure.
Figure 10F:
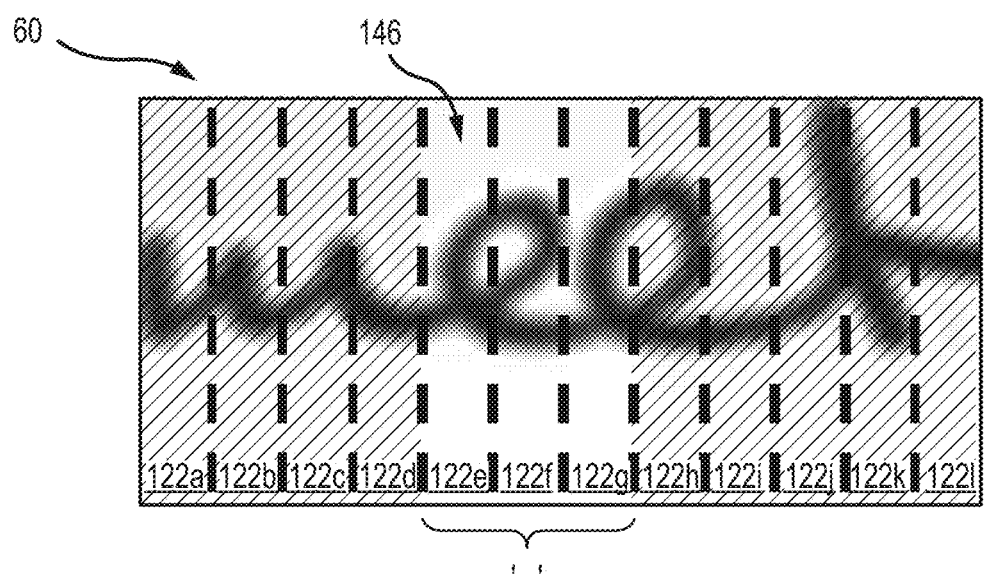
FIG. 10F is a pictorial representation of an embodiment of a 3-wide odd filter across a word block, in accordance with embodiments of the present disclosure.
Figure 10G:
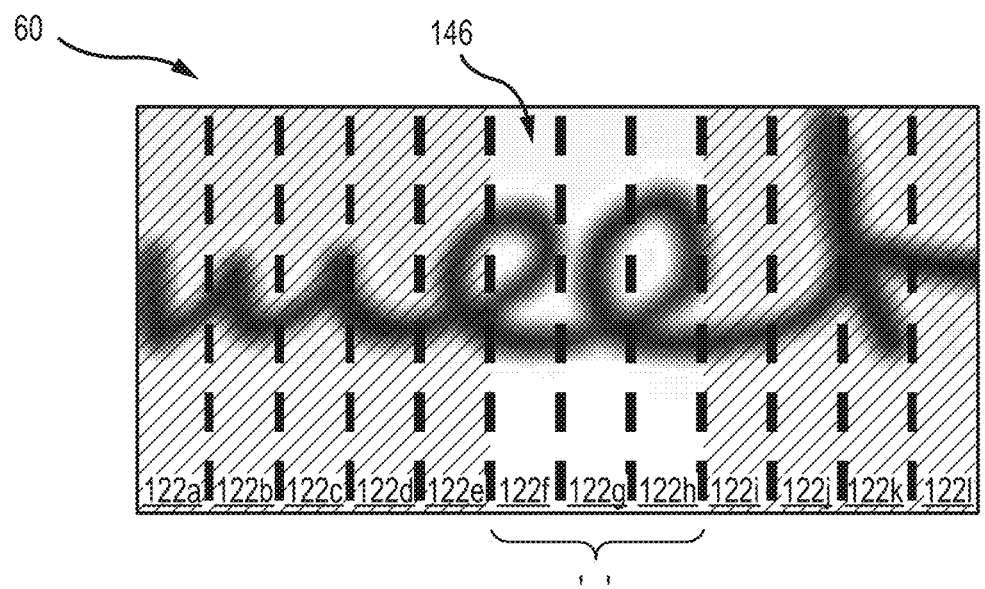
FIG. 10G is a pictorial representation of an embodiment of a 3-wide odd filter across a word block, in accordance with embodiments of the present disclosure.
Figure 10H:
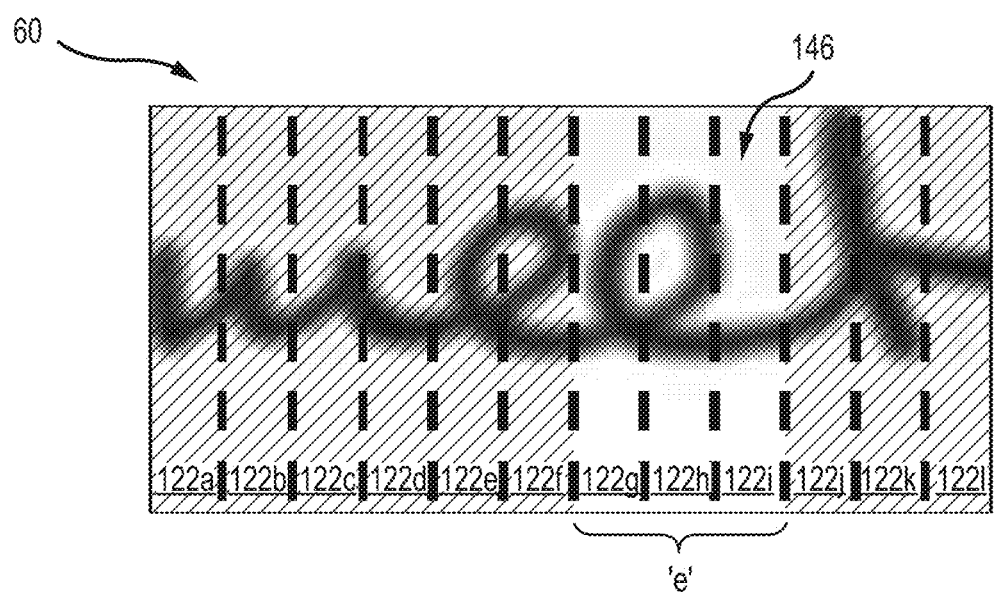
FIG. 10H is a pictorial representation of an embodiment of a 3-wide odd filter across a word block, in accordance with embodiments of the present disclosure.
Figure 10I:
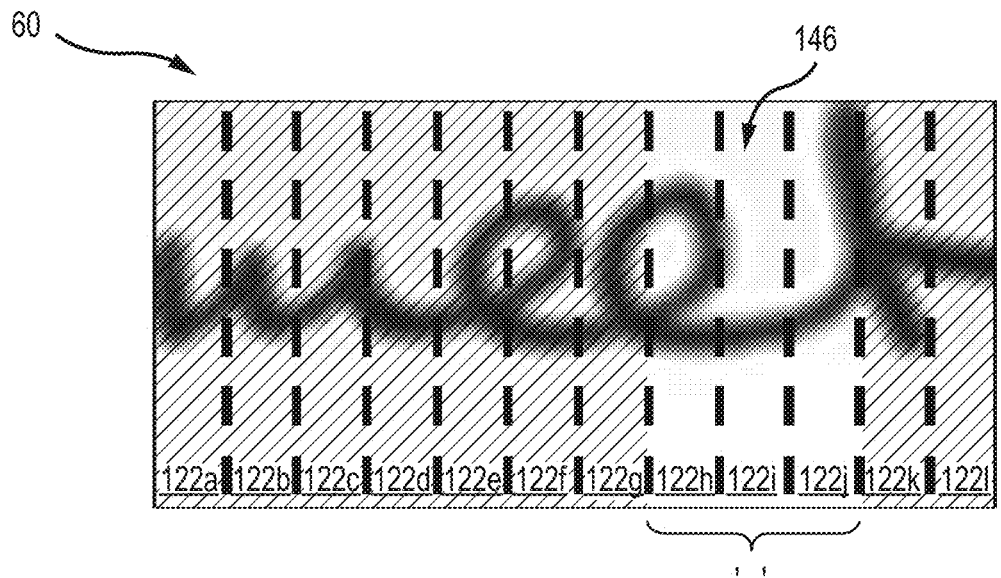
FIG. 10I is a pictorial representation of an embodiment of a 3-wide odd filter across a word block, in accordance with embodiments of the present disclosure.
Figure 10J:
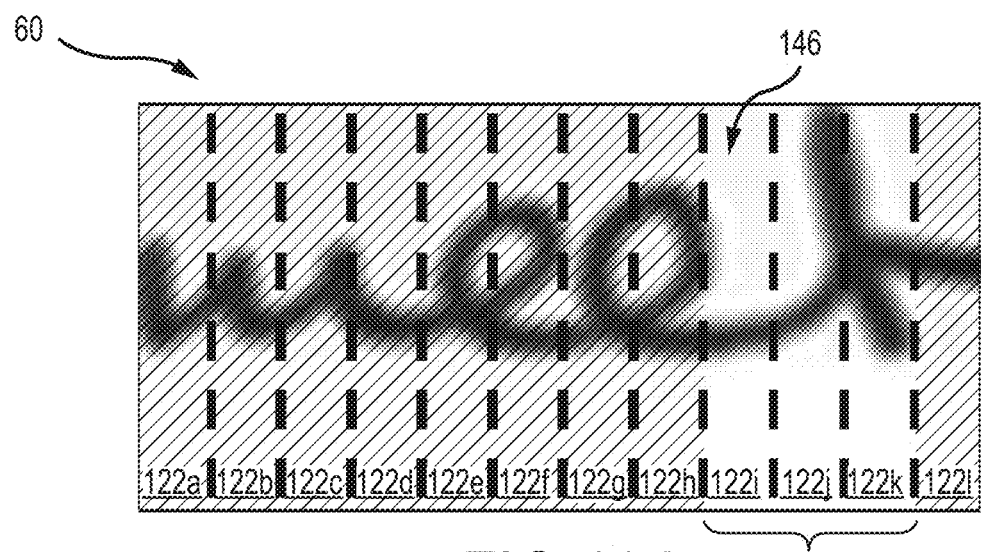
FIG. 10J is a pictorial representation of an embodiment of a 3-wide odd filter across a word block, in accordance with embodiments of the present disclosure.
Figure 10K:
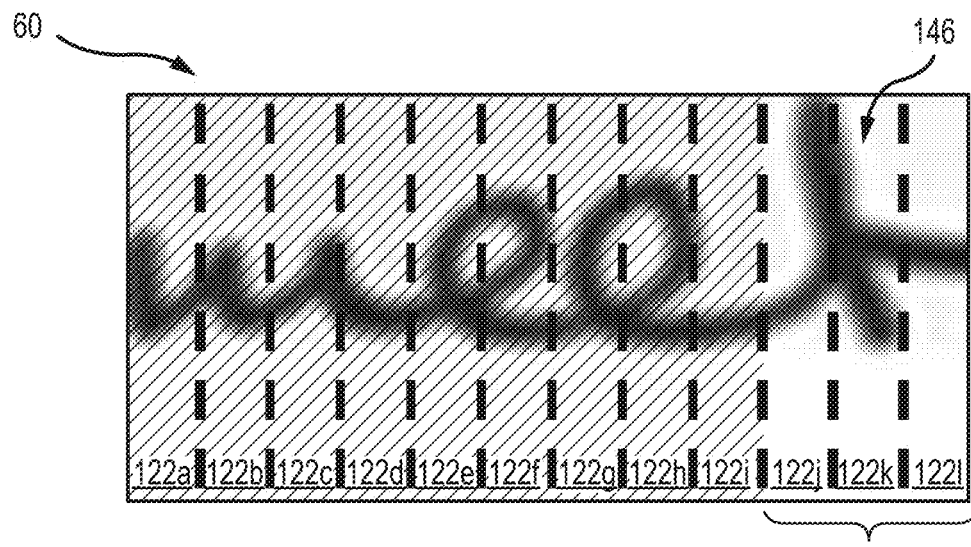
FIG. 10K is a pictorial representation of an embodiment of a 3-wide odd filter across a word block, in accordance with embodiments of the present disclosure.
Figure 10L:
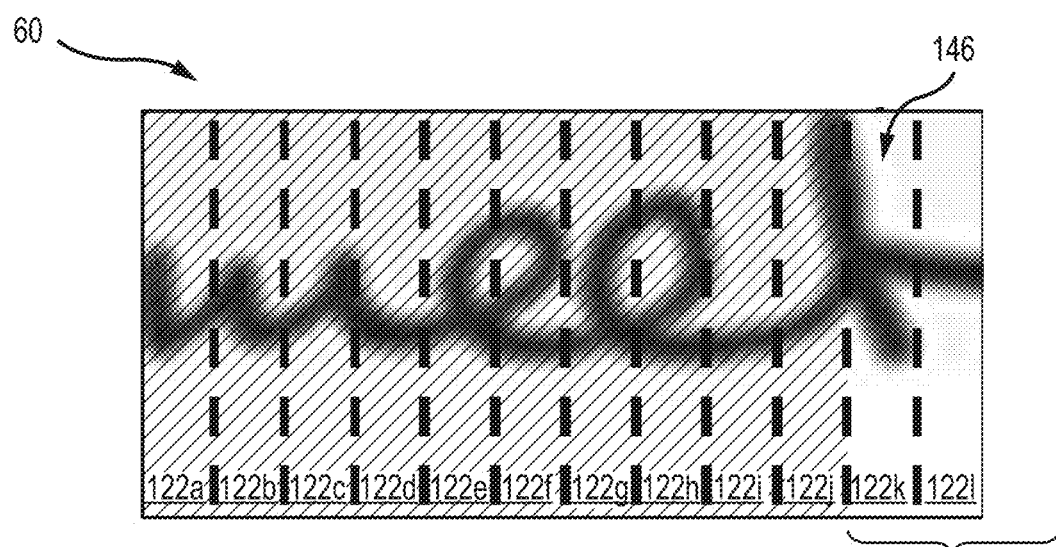
FIG. 10L is a pictorial representation of an embodiment of a 3-wide odd filter across a word block, in accordance with embodiments of the present disclosure.

FIGS. 9A-9H are pictorial representations of a receptive field of a 3-wide odd filter 140 on the 16N word block 60 illustrated in FIGS. 7A-7G and 8A-8G. In the illustrated embodiment, the filter 140 is not centered on a symbol. For example, as shown in FIG. 9A, the filter 140 is positioned over the regions 122a and 122b to return the letter "m". Additionally, as the filter 140 moves over with a stride of 1, FIG. 9B illustrates the filter 140 positioned over the regions 122a, 122b, and 122c. As shown, the regions within the filter 140 include the space between the "m" and the FIGS. 10A-10L are pictorial representations of a receptive field of a 3-wide odd filter 146 on a 24N word block 60. In the illustrated embodiment, the filter 140 is centered over the symbols as the filter 140 steps across the word block 60, however, there are two blanks between each symbol. For example, as illustrated in FIG. 10A, the filter 140 is positioned over the regions 122a and 122b, thereby returning a blank. As the filter 140 steps over, with a stride of 1, the filter 140 is positioned over the regions 122a, 122b, and 122c, thereby returning the "m", as illustrated in FIG. 10B. Subsequently, as the filter 140 steps through the word block 60 with a stride of 1, each symbol will be evaluated by the CNN, thereby enabling the CNN to determine the characters forming the word block 60. In the illustrated embodiment, even tap filters center on each symbol as the fully convolution filter steps across the word, and odd filters either do not, or generate more than one blank between each symbol prediction. Despite that odd filters are much more common in the signal processing domain, even filters may be used because 1) each of the 2N+1 evaluations are centered, on average, over a symbol or a blank, and 2) there is exactly one blank prediction between each symbol prediction. Even tap filters center on each symbol as the fully convolution filter steps across the word, and odd filters either do not, or generate more than one blank between each symbol prediction.

In certain embodiments, the string of symbols from the CNN can either be a word, a phone number, street address, or the like. In certain embodiments, the string of symbols represents a difficult, misspelled, or abbreviated word. As such, if a dictionary of a valid word block exists, a post processing operation using symbol probabilities and character error rate may be utilized to identify the symbols forming the word blocks 60. A pre-processing CNN can detect the type of text block, for example, utilizing a fourth CNN. For example, if it detects an address, word blocks corresponding to house numbers or zip codes can be passed into numeric dictionary classifiers. Similarly, pre-processing CNN can be modified to output a word block category of numeric, acronym, punctuation, etc., which may be utilized to constrain later processing of symbols, or even detect language or OCR vs. ICR and block vs. script to direct later processing.

In certain embodiments, a normalized character error rate (CER) is represented by Equation (1).

$$CER = \frac{R+D+I}{R+D+I+C} \quad (1)$$

In Equation (1), R is the number of characters replaced, D is the number of characters inserted, I is the number of inserted characters, and C is the number of correct characters. In certain embodiments, CER may be utilized on a known-limited vocabulary matching system. To improve performance in applications that have a known-limited vocabulary, CER-based vocabulary matching systems may utilize dynamic programming along with Equation (2).

$$C_{i,j} = \min(C_{i-1,j} + 1, C_{i,j-1} + 1, Diag) \quad (2)$$

where:

$$Diag = \begin{cases} C_{i-1,j-1}, \\ C_{i-1,j-1} + 1 \end{cases}$$

For example, the CER between the output of the CNN and every word in the vocabulary may be computed. The word with the lowest CER can be chosen as the prediction. However, such an approach may disregard the information computed from the CNN, and as a result, character probabilities may be utilized to improve predictive modeling. In certain embodiments, this is referred to as "probabilistic CER" and uses character probabilities instead of simply the top character prediction. For example, for each character replaced, the error is equal to one minus the probability of the replacing character. For a character deleted, the error is equal to one minus the probability of a blank. For a character inserted, the error is equal to one minus the probability of the inserted character. Furthermore, in certain embodiments, there is weighted penalization for insertions and deletions, as opposed for replacements. For example, insertions and deletions may be penalized more than replacements. The word with the smallest CER error is then picked as the prediction. Furthermore, along with the CER, the method may also report the Word Error Rate (WER). In certain embodiments, the WER determines the average word-level accuracy of a system.

FIGS. 11A-11D are pictorial views of an embodiment of the CER calculation based on Equation (1). In the illustrated embodiment, the CER error is predicted between the word "tymme" and the word "time" using dynamic programming and Equation (2). FIGS. 11A-11D illustrate after one step of the calculation, after finishing "t", after finishing the first "m", and the final indication of a CER of 2, respectively.

Figure 12:
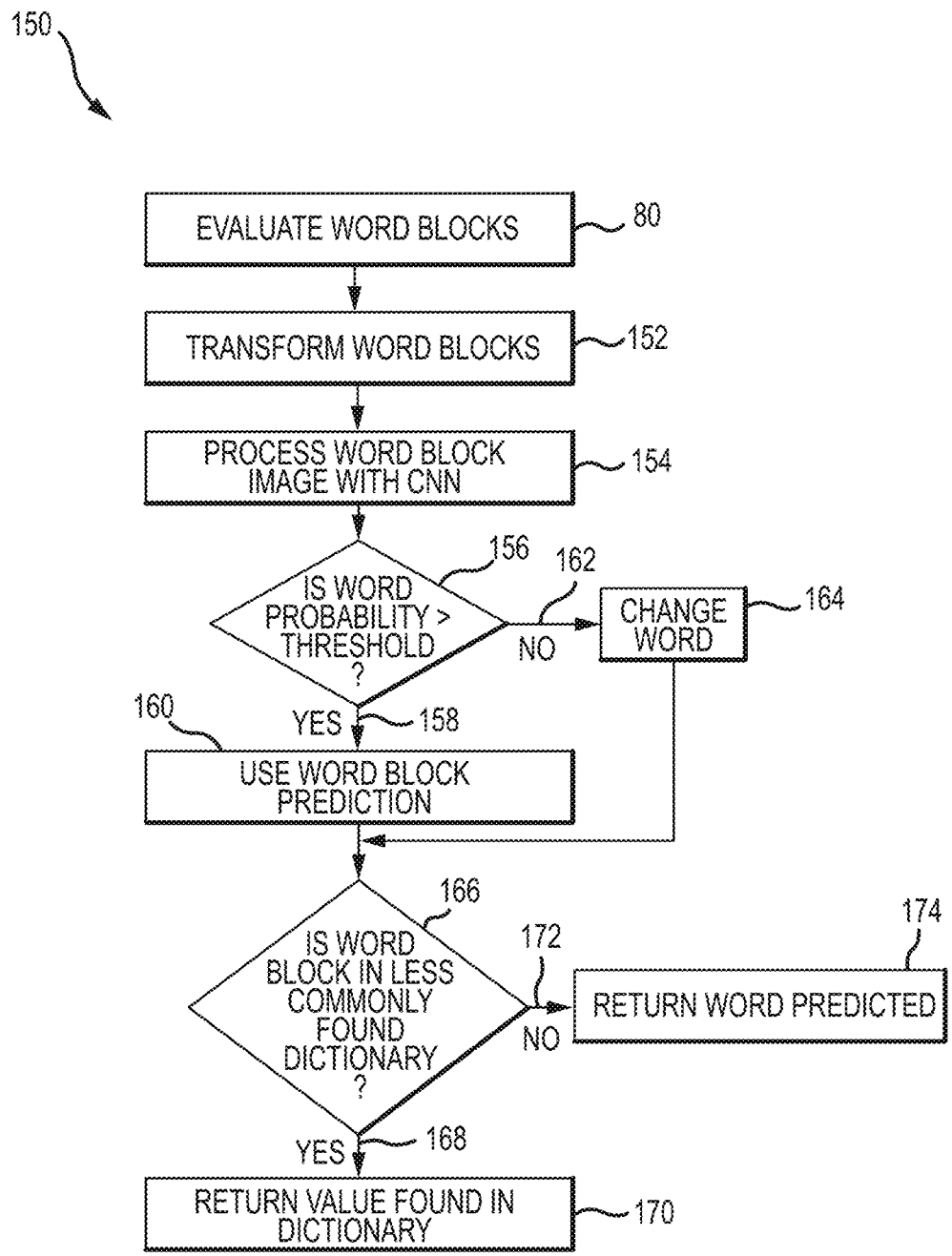
FIG. 12 is a flow chart of an embodiment of a method for returning a predicted word, in accordance with embodiments of the present disclosure.

FIG. 12 is a flow chart of an embodiment of a method 150 for returning a predicted word utilizing CNN and CER. In certain embodiments, the method 80 for evaluating word blocks 60 may be performed prior to performing the method 150. Specifically, the method 150 may be performed after block 94. Thereafter, the word block 60 is transformed (block 152). For example, the word block 60 may be transformed to a canonical form, for example, based off of a length prediction. As a result, the word block 60 will be transformed to a standard height and width based off a number of symbols predicted. Next, the word block 60 is processed through the CNN (block 154). In certain embodiments, as described above, a single CNN may be utilized to perform multiple steps of the evaluation of the word block 60. Thereafter, the word probability is evaluated against a threshold τ, for example using cross validation (operator 156). The word probability may be determined based on the input learning data sets or statistical analysis of a language. For example, in certain embodiments, the word "the" is utilized more often than the word "encyclopedia" in ordinary language. As a result, it may be more statistically probable that the word "the" is present in a sample of written text than "encyclopedia." Accordingly, the probabilities may vary based on statistical analysis of one or more languages. Furthermore, the probability may also be generated based on the type of document being processed. For example, tax returns may have a higher probability of numbers than a grocery list. If the word probability is greater than the threshold (line 158), the value found in the dictionary is returned (block 160). However, if the word probability is less than the threshold (line 162), the word block 60 is evaluated to determine if it is less commonly found in a dictionary (operator 166). If it is (line 168), word block prediction is used (block 170). If it is not (line 172), the predicted word is returned (block 174). In this manner, CER and CNN may be utilized together to predict words from handwritten documents. Furthermore, utilizing embodiments of the method described in FIG. 12 enable obvious, easier to predict words to be returned quickly and efficiently. For example, as described above, if a word is readily and confidently identified as being in a common dictionary, the value in the dictionary can be returned. However, as illustrated in the embodiment described in FIG. 14, if the word is not readily identified in the dictionary CNN, a second CNN (which may be the same, or substantially the same, CNN as the first CNN, in certain embodiments), may be utilized. In certain embodiments, the second CNN may utilize greater processing resources, since the word block 60 is a less common word. As will be described below, in certain embodiments, if the word block 60 cannot be identified utilizing the dictionaries, symbol recognition may be used. In other words, the word block 60 may be evaluated to predict the word or symbols forming the word block 60.

Figure 13:
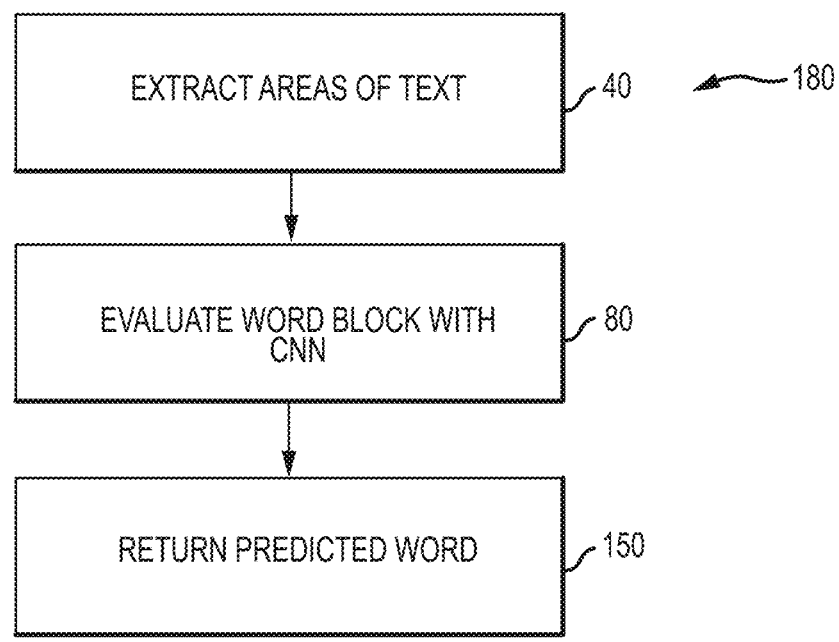
FIG. 13 is a flow chart of an embodiment of a method for identifying handwritten characters, in accordance with embodiments of the present disclosure.

FIG. 13 is a block diagram of a method 180 to identify handwritten characters using a CNN. As described in detail above, methods for extracting text, evaluating the text, and predicting words may be utilized to return a word (e.g., a predicted word or a value found in a dictionary). For example, the method 40 may be performed and followed by the method 80, as illustrated in FIG. 5. As a result, the word block 60 may be extracted from a block of text and subsequently evaluated via a CNN, such as a dictionary CNN. Thereafter, the method 150 may be utilized to evaluate the extracted text and determine whether to return a predicted word or a value found in a dictionary, such as a dictionary CNN. In this manner, blocks of handwritten text may be evaluated.

Figure 14:
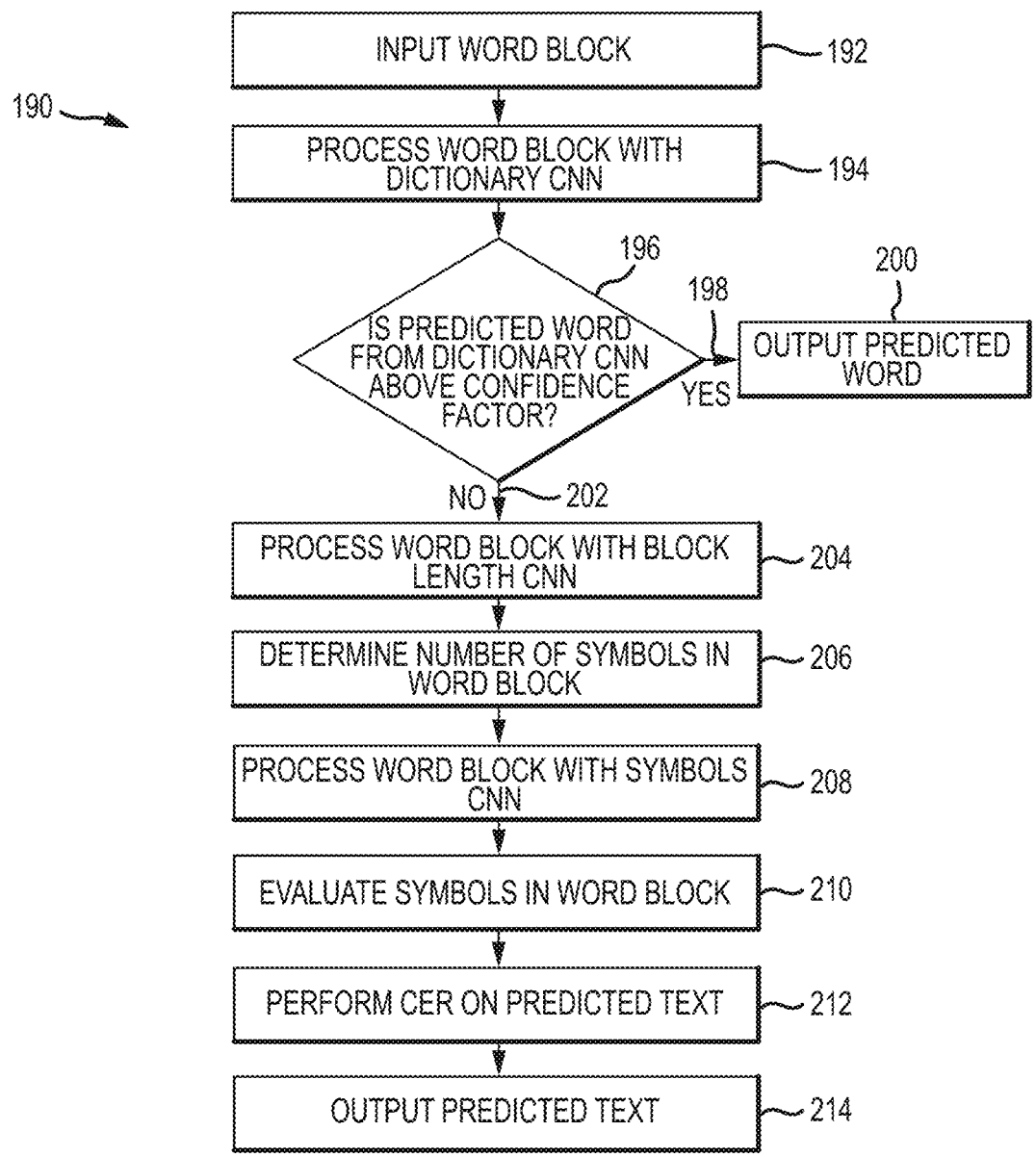
FIG. 14 is a flow chart of an embodiment of a method for identifying handwritten characters using one or more convolutional neural networks, in accordance with embodiments of the present disclosure.

FIG. 14 is a block diagram of a method 190 for analyzing hand written text utilizing one or more CNNs. First, the word block 60 is inputted to a CNN (block 192). For example, the word block 60 may be processed and sized into an input image such that the CNN can perform one or more convolutional, non-linearization, and/or pooling steps on the input image. Next, the input image may be analyzed with a dictionary CNN to determine if the input image is readily identifiable as a commonly used word (block 194). For example, the CNN may process the input image and compare the input image to words in a dictionary database. Thereafter, the predicted word may be evaluated against a threshold or confidence factor (operator 196). If the predicted word is above the threshold or confidence factor (line 198), the predicted word is output and the process ends (block 200). However, if the predicted word is below the threshold or confidence factor, or cannot otherwise be confidently determined (line 202), then the input image is reprocessed in the CNN to determine the number of symbols in the CNN (block 204). Next, the CNN (e.g., a block length or symbol CNN) is utilized to determine the number of symbols in the word block 60 (block 206). Thereafter, the output from the second CNN is evaluated by the CNN (e.g., a third CNN or a prediction Symbols CNN) to evaluate the individual symbols in the word block 60 for prediction (block 208). The third CNN evaluates the symbols in the word block 60 (block 210). For example, as described in detail above with reference to FIG. 7, the third CNN may split the input and perform filtering with zero padding to analyze the symbols. Then, CER is performed to evaluate the predicted text (block 212). For example Equations (1) and (2) may be utilized to perform CER. Thereafter, the predicted text may be output (block 214). In this manner, handwritten text (e.g., words, symbols, numbers, etc.) may be analyzed and predicted. Moreover, as described above, it should be appreciated that, in certain embodiments, a single CNN architecture may be utilized to perform each step. That is, reference to a "first CNN" or "second CNN" or "third CNN" should not be interpreted to mean different architectures or code structures. In fact, the CNN may be reused for several iterations to obtain desirable results.

Figure 15:
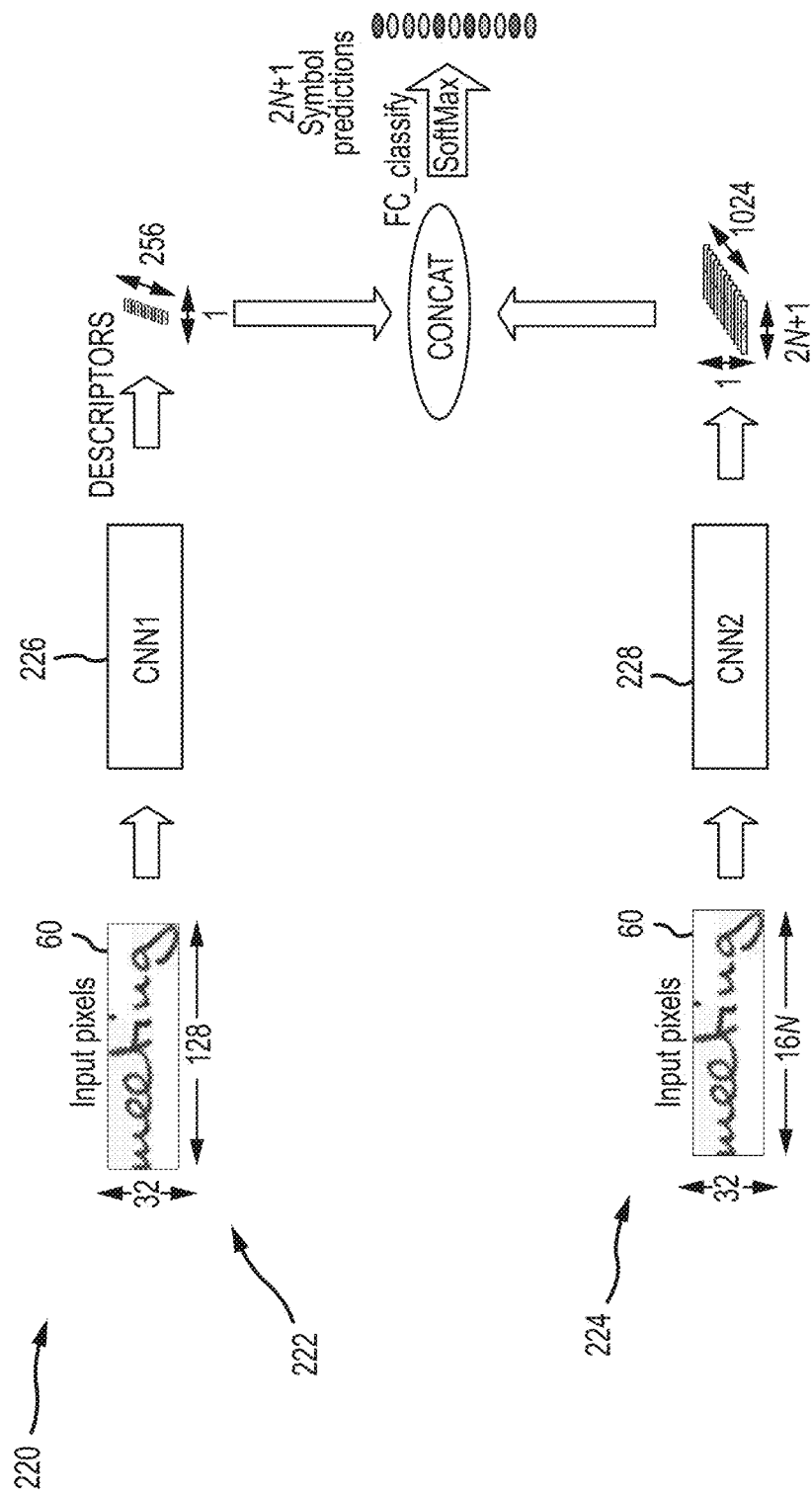
FIG. 15 is a schematic diagram of an embodiment of baseline architecture of a convolutional neural network (CNN), in accordance with embodiments of the present disclosure.

FIG. 15 is a schematic block diagram of an architecture 220 to identify handwritten characters utilizing a fully connected CNN augmented with global information. The architecture 220 includes a first path 222 and a second path 224. It should be appreciated that while the paths are delineated at "first" and "second" that either may be followed in any particular order, or both paths 222, 224 may be followed simultaneously. In the illustrated embodiment, the first path 222 generated a global description or descriptor using CNN1 226, which may be concatenated with a fully convolutional handwritten character CNN2 228. It should be appreciated that CNN1 may use all components described in FIGS. 4A and 4B, with exceptions. For instance, in embodiments the delineated "Prediction: Symbols" steps may be omitted from CNN1 226 in the illustrated architecture 220. Furthermore, more or fewer convolution, pooling, or ReLU steps may be utilized.

CNN1 226 includes a 1×256 fully connected layer, where the 256 long vector is a global descriptor of the input word. This may also be referred to as an attribute and may be a number, letter, type of language, or any other feature of the word block 60 processed by CNN1 226 that may provide some sort of characteristic to the word block 60. Also note, the length of the vector, described as 256 above is a hyperparameter that can be changed.

The second path 224 having CNN2 228 includes the 1×2N+1×1024 and may also be substantially similar to the network described in FIGS. 4A and 4B. As such, the outputs from the first and second paths 226, 228 may be similar to the output from FIGS. 4A and 4B, but with each of the 2N+1 outputs concatenated with the 256 global descriptor. The resulting buffer is 1×2N+1×1280 which feeds into the final softmax layer for symbol prediction. By adding the global descriptor before the final softmax layer, each symbol predictor has access to information about the entire word block. This information not only includes all the symbols, but characteristics of all the symbols including pen type, handwriting style, noise, background, etc. In embodiments, no extra supervised information is provided for the model to learn this 256 global descriptor. In other words, the model uses it as it sees fit to ultimately lower the cost (which is accurate symbol prediction). It should be noted, that a third, fourth, or more paths can be added similar to the second path 224. For example, a path can be added which takes as input the entire text block. Similarly, a path can be added which can be an entire line of text, an entire paragraph, an entire field entry from a form, an entire document, or an entire batch of documents. One or more of these secondary streams can additionally be used in isolation or in combination with another for increased understanding about the word block, and ultimately better performing handwriting recognition.

When utilizing the architecture 220, the network determines what is learned. That is, by joining the features of the first path 222 and the second path 224, the network determines which global descriptions may be useful in processing the information. In certain embodiments, the first path 222 may evaluate an entire word or segment of the word block 60. The second path 224, on the other hand, may evaluate each individual character or a region of characters. Over time with training, the network optimizes to choose what to learn to produce accurate symbol prediction. For example, the network may determine that identifying a language as a global descriptor facilitates learning, and therefore, that descriptor may be utilized when characters are identified. As such, the architecture 220 illustrated in FIG. 15 provides context for what is being predicted.

Figure 16:
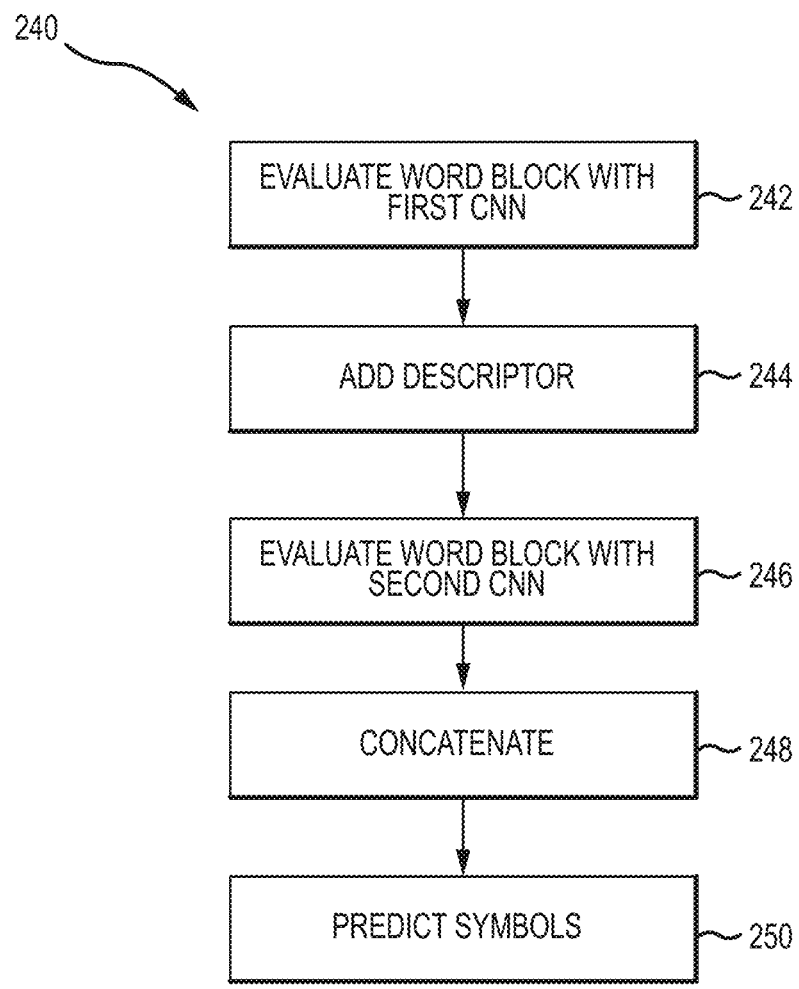
FIG. 16 is a flow chart of an embodiment of a method for identifying handwritten characters, in accordance with embodiments of the present disclosure.

FIG. 16 is a block diagram of a method 240 for evaluating the word block 60. In the illustrated embodiment, the method 240 includes evaluating the word block 60 with a first CNN1 226 (block 242). For example, the first CNN1 226 may be the CNN illustrated in FIGS. 4A and 4B. The method 240 also includes assigning a descriptor to the word block 60 (block 244). For instance, the description may also be referred to as an attribute and correspond to a feature of the word block 60, such as if the word block 60 is in cursive or print, is numbers, what language the word block is written in, and the like. The word block 60 is evaluated with the second CNN2 228 (block 246). In certain embodiments, the second CNN2 228 is the same, or substantially the same, CNN illustrated in FIG. 4. Then, the outputs from the first CNN1 226 and the second CNN2 228 are concatenated (block 248). Thereafter, the symbols are predicted (block 250). For example, the symbols may be predicted utilizing the softmax layer. In this manner, word blocks 60 may be evaluated, assigned relevant descriptors, and predicted.

Figure 17:
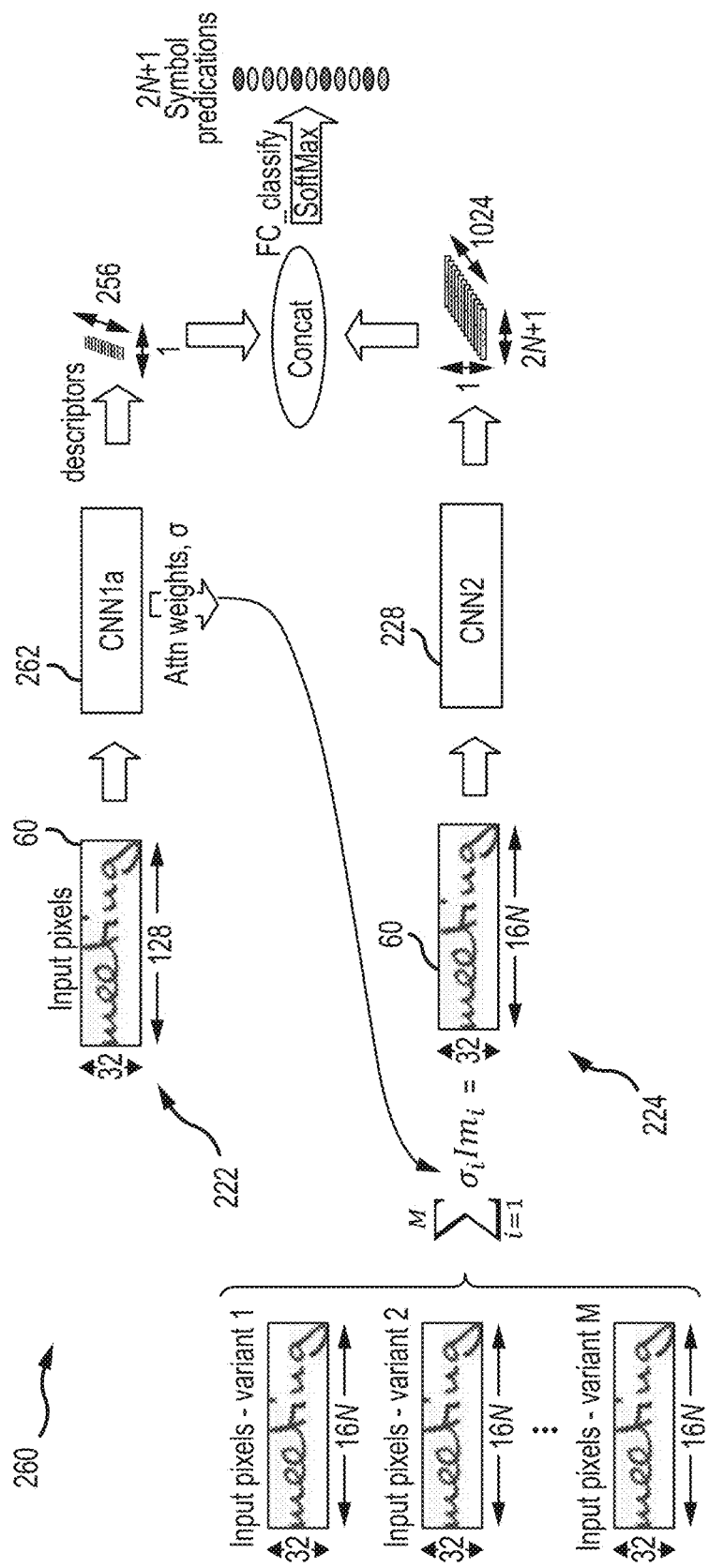
FIG. 17 is a schematic diagram of an embodiment of baseline architecture of a convolutional neural network (CNN), in accordance with embodiments of the present disclosure.

FIG. 17 is a schematic block diagram of an architecture 260 to identify handwritten characters utilizing attention vectors. The architecture 260 is similar to the architecture 220 illustrated in FIG. 15. In the illustrated embodiment, the first path 222 having CNN1$a$ 262 is used for two different purposes, but it should be appreciated that the CNN1$a$ 262 may be used for any number of purposes in certain embodiments. First, the CNN1 262 computes a global descriptor, which is concatenated with CNN2 before symbol prediction, similarly to the function described in FIG. 15. Additionally, the CNN1$a$ 262 also computes an attention vector. During training and testing, each input sample is modified M different but distinct ways. During testing, back propagation learns the attention weights, σ with the goal of once again lowering the cost. For example, variants 1 . . . m, may be skew variations on each sample, variants n . . . p may be slant variations, variations q . . . t may be noise variations, and so on for a total of M variations. The attention weights σ are then learned such that a linear combination of the M variations gives a lower overall cost. In embodiments, no extra supervised data is needed. In embodiments, the number and order of the M different variants is exactly the same for all training and testing samples. However, it should be appreciated that the order of the M different variants may be modified.

Embodiments of the architecture illustrated in FIG. 17 apply the different attention vectors to the word block 60 in order to achieve desirable results. For instance, the attention vectors computed by the first CNN1$a$ 262 are provided to the second CNN2 228 for processing. In certain embodiments, the most likely or desired variant may pass through the second CNN2 228, while others are discarded. For instance, if the variant is skew, a skew of 80 percent may be unlikely, and therefore not used. However, a minor skew, such as 10 percent, may be more likely. As such, the attention weight σ will be developed through training to simplify the different variants and lower costs (e.g., time to develop an accurate output). As a result, all of the skews may be part of the image, but some are given additional weight and are preferentially treated when processed by the second CNN2 228. It should be appreciated that skew is only used as an example and other variants described above may also be utilized. In certain embodiments, the weight factors may be referred to as steering factors.

Figure 18:
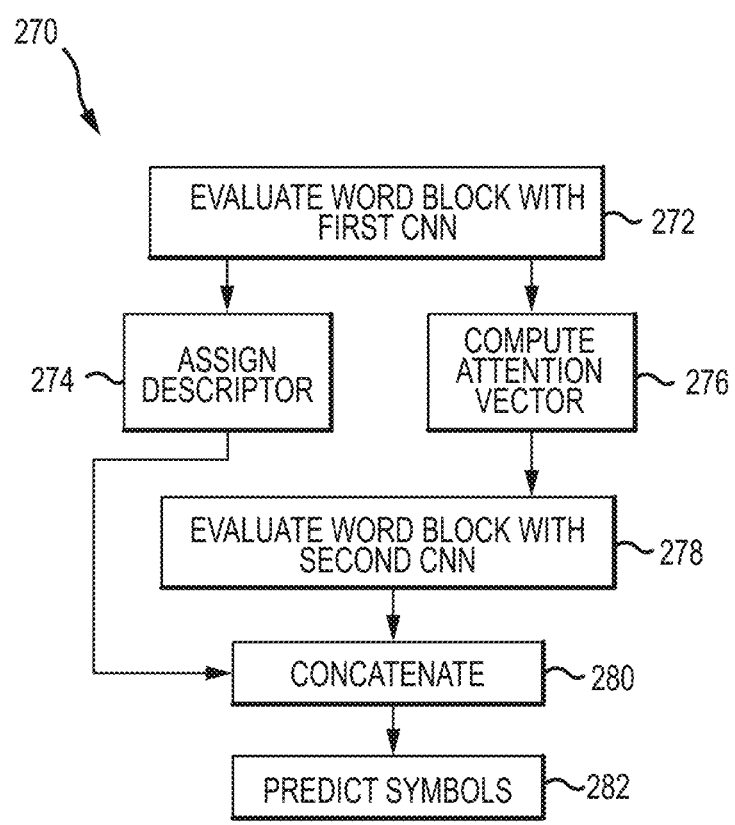
FIG. 18 is a flow chart of an embodiment of a method for identifying handwritten characters, in accordance with embodiments of the present disclosure.

FIG. 18 is a flow chart of an embodiment of a method 270 for evaluating the word block 60. The word block 60 is evaluated with the first CNN1$a$ 262 (block 272). This CNN1$a$ 262 adds a descriptor (block 274) and computes an attention vector (block 276). As described above, the descriptor may correlate to an identifying characteristic of the word block 60 and the attention vector applies a weighted factor to one or more variants associated with the word block 60. The attention vectors are directed into the second CNN2 228 (block 278). As such, only the most likely variants are evaluated by the second CNN2 228. Thereafter, the results are concatenated (block 280) and the symbols are predicted (282).

Figure 19:
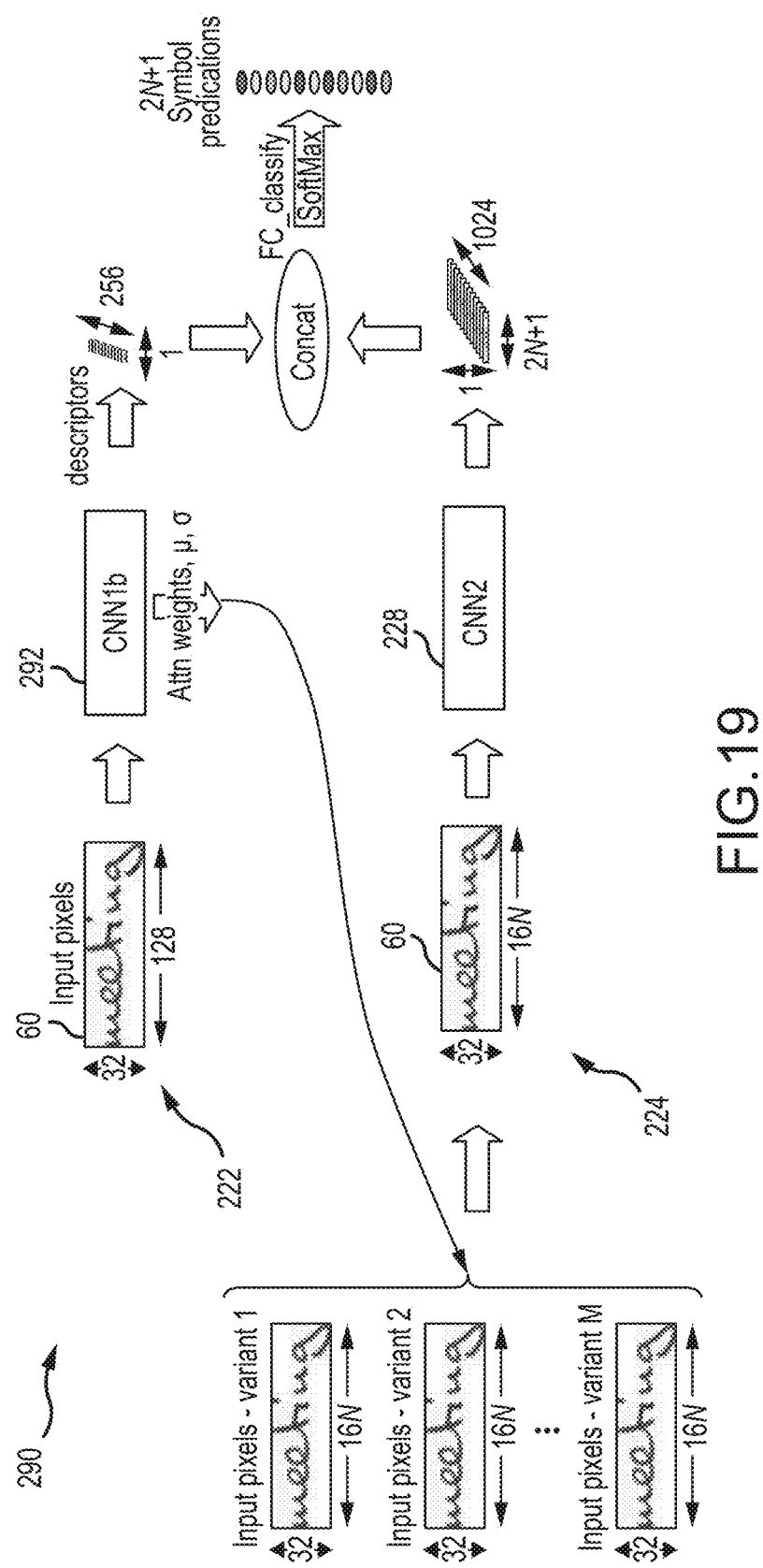
FIG. 19 is a schematic diagram of an embodiment of baseline architecture of a convolutional neural network (CNN), in accordance with embodiments of the present disclosure.

FIG. 19 is a schematic block diagram of an architecture 290 to identify handwritten characters utilizing attention vectors and Gaussian distribution. The architecture 290 is similar to the architecture 220 and 260 illustrated in FIGS. 15 and 17, respectively. Differing from CNN1$a$ 262, the illustrated CNN1$b$ 292 does not need to know in advance the number of M variations. In embodiments, this configuration may provide advantages when the attention vector is done over a single input variation. For example, the M input variations could be for slant, where the first variation is a −20° slant, the middle variation is a 0° slant and the M$^{th}$ variation is a +20° slant. Knowing the exact number of discrete variations may not be necessary, and the number of discrete variations can change from training to test time; however, the mean of the sweep of variations may be the same. In other words, in the example presented above, the middle sample is 0° slant. When there is only a single variation being used, the architecture in FIG. 19 is an improvement over that in FIG. 17 as not only does the model not need to know the exact number of samples in advance, but the number of parameters, or weights is less, leading to faster convergence. The architecture 290 of FIG. 19 uses a Gaussian distribution, solving for a single mean, μ, and standard deviation, σ. This method can be modified to solve for a family of Gaussians, or a k$^{th}$ order polynomial, or any other parametric equation. Similarly, the architecture of FIG. 19 outputs a single mean value μ, which chooses only one single input variant to be passed into CNN2 228. For example, instead of passing a linear combination of M variations, only one of the M variations is passed into CNN2. In this latter case, back propagation may have trouble solving for a derivative of a step function, so reinforcement learning can replace back propagation when solving for the attention weights.

Figure 20:
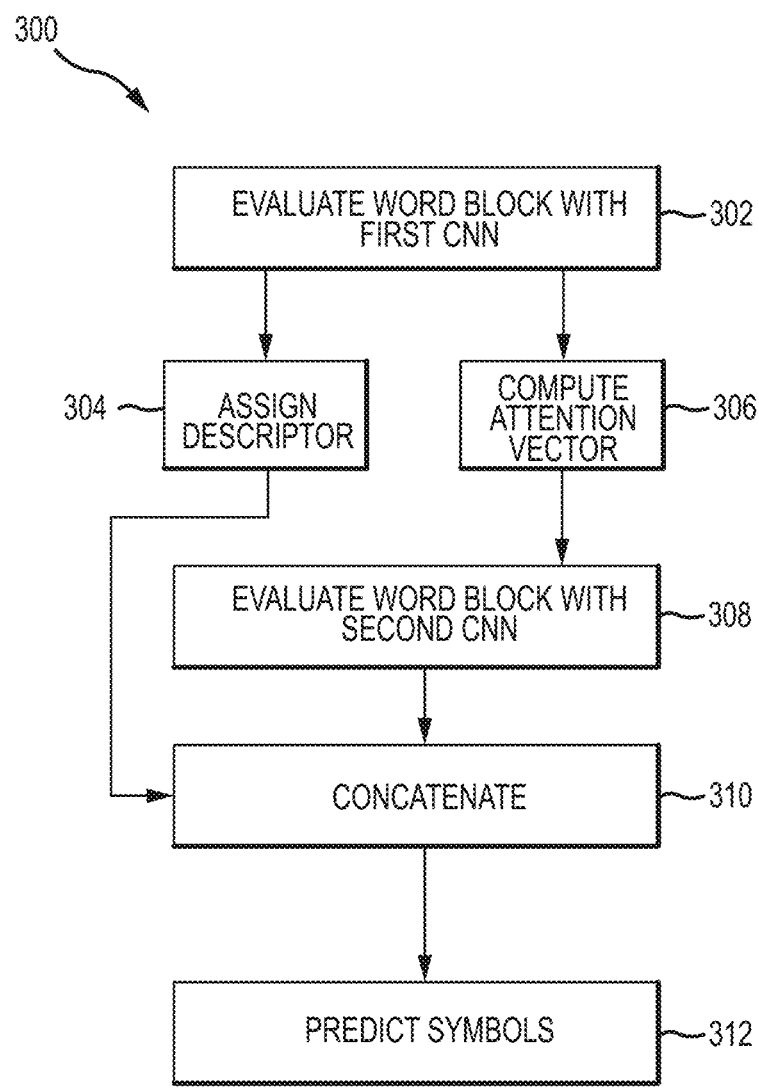
FIG. 20 is a flow chart of an embodiment of a method for identifying handwritten characters, in accordance with embodiments of the present disclosure.

FIG. 20 is a flow chart of an embodiment of a method 300 for evaluating the word block 60. The word block 60 is evaluated with the first CNN1b 292 (block 302). This CNN1b 292 adds a descriptor (block 304) and computes an attention vector with a Gaussian distribution (block 306). As described above, the descriptor may correlate to an identifying characteristic of the word block 60 and the attention vector applies a weighted factor to one or more variants associated with the word block 60. The attention vectors are directed into the second CNN2 228 (block 308). As such, only the most likely variants are evaluated by the second CNN2 228. Thereafter, the results are concatenated (block 310) and the symbols are predicted (312).

Figure 21:
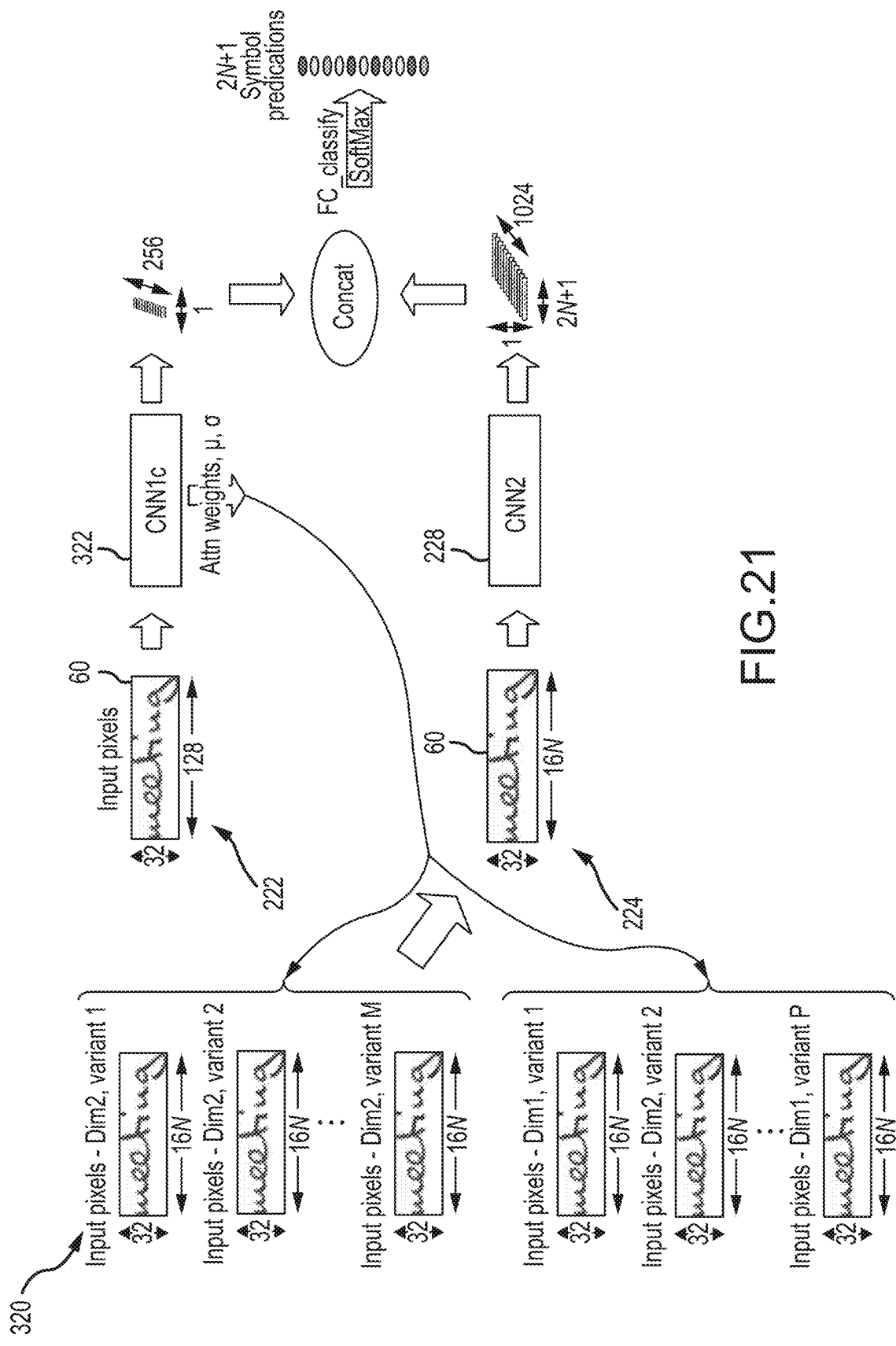
FIG. 21 is a schematic diagram of an embodiment of baseline architecture of a convolutional neural network (CNN), in accordance with embodiments of the present disclosure.

FIG. 21 is a schematic block diagram of an architecture 320 to identify handwritten characters utilizing attention vectors and Gaussian distributions. The embodiment illustrated in FIG. 21 differs from FIG. 19 in that multiple parametric attention weights can be solved via the first CNN1c 322, where each parametric weight is used for a specific family of input variation. For example, one attention weight solves for slant, another attention weight solves for rotation, another solves for noise, and so on. The output of each family of attention weights can either be concatenated before being passed into CNN2, or additional attention weights can be solved which are the linear combinations of each family of variation, forming a hierarchical of attention weights to solve.

It should be noted that the attention methodologies used in FIGS. 17-21 can be used with any ICR technique, not only the fully convolutional technique as described herein. For example, attention weights can be used with an HMM or LSTM paired with CTC model.

Figure 22:
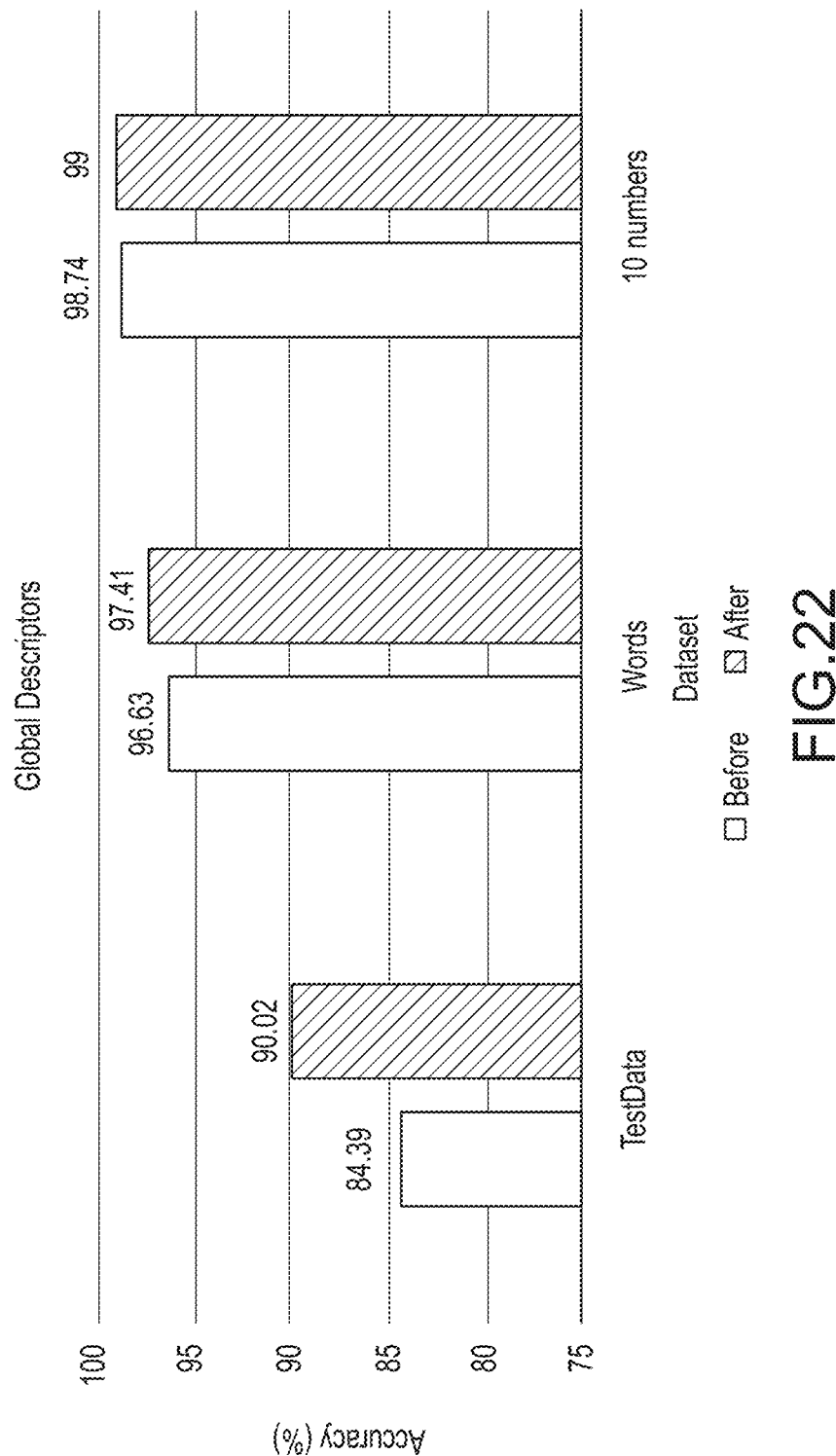
FIG. 22 is a graphical representation of an embodiment of testing data, in accordance with embodiments of the present disclosure.

FIG. 22 shows sample performance over three test sets with and without the global descriptor in FIG. 15. The three test sets are: 1) TestData—each input word block consists of a random set of symbols, numbers, and letters; 2) Words—each input word block consists of an English word; and 3) 10 numbers—each input word block is made up of 10 random digits. For each of the three datasets, the addition of the global descriptor improves results. The improvement on TestData is the most pronounced because it is the most difficult dataset and it has the most room for improvement.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A system, comprising:
at least one processor; and
memory including instructions that, when executed by the at least one processor, cause the system to:
receive a digitized object, the digitized object corresponding to an image including at least one symbol;
form digitized line blocks from the digitized object by determining whitespace separators in the digitized object;
transform the line blocks into one or more word blocks separated by whitespace, the one or more word blocks having a value associated with at least one symbol forming the one or more word blocks;
resize each word block of the one or more word blocks into a canonical representation of a fixed height based off a predicted number of symbols of the image;
evaluate each word block of the one or more word blocks with a dictionary, the dictionary containing a collection of common words;
output a first word prediction when one or more of the word blocks corresponds to a word in the collection;
assign one or more qualitative descriptors to the one or more word blocks when the one or more word blocks do not correspond to the collection;
perform probabilistic correction on the one or more word blocks; and
output a second word prediction, the second word prediction corresponding to the value of the word block.

2. The system of claim 1, wherein the instructions when executed further cause the at least one processor to assign a steering factor to the one or more word blocks when the one or more word blocks do not correspond to the collection, the steering factor being used to prioritize further evaluation of the one or more word blocks.

3. The system of claim 2, wherein the steering factors are weight factors comprising attention weights, attention vectors, Gaussian distributions, or a combination thereof.

4. The system of claim 1, wherein:
a first neural network evaluates the one or more word blocks against the dictionary and assigns the one or more descriptors to the one or more word blocks; and
a second neural network receives the one or more descriptors, the one or more descriptors used by the second neural network to predict the value of the one or more word blocks.

5. The system of claim 1, wherein the one or more descriptors include handwriting style, slant, skew, rotation, blur, marker type, paper type, image fidelity, background threshold, or a combination thereof.

6. The system of claim 1, wherein the instructions when executed further cause the at least one processor to resize each world block of the one or more word blocks into a canonical width based upon a prediction of a number of symbols in the world block.

* * * * *